United States Patent

Edwards et al.

[15] 3,665,851

[45] May 30, 1972

[54] ELECTROSTATIC SCREEN PROCESS PRINTING

[72] Inventors: James W. Edwards, Creve Coeur; Harry J. Larrigan, St. Louis; Shelly W. Mays, Jr., St. Louis, all of Mo.

[73] Assignee: Electrostatic Printing Corporation of America, San Francisco, Calif.

[22] Filed: July 19, 1965

[21] Appl. No.: 472,829

[52] U.S. Cl. ..........................101/114, 101/38, 101/129
[51] Int. Cl. ..........................................................B41f 17/18
[58] Field of Search.....................101/DIG. 13, 128.1, 128.2, 101/129, 114; 118/637

[56] References Cited

UNITED STATES PATENTS

| | | | |
|---|---|---|---|
| 1,784,912 | 12/1930 | Scott.............................. | 101/DIG. 13 |
| 2,162,317 | 6/1939 | Rez................................. | 101/DIG. 13 |
| 2,484,671 | 10/1949 | Bauman......................... | 101/DIG. 13 |
| 2,966,429 | 12/1960 | Darrel et al. .................. | 101/DIG. 13 |
| 3,081,698 | 3/1963 | Childress ....................... | 101/DIG. 13 |
| 3,218,967 | 11/1965 | Childress ....................... | 101/DIG. 13 |
| 3,228,326 | 1/1966 | Childress ....................... | 101/DIG. 13 |
| 2,105,378 | 1/1938 | Smith.............................. | 101/128 X |
| 2,288,020 | 6/1942 | Noland et al. ................. | 101/128.2 |
| 2,347,022 | 4/1944 | Austin............................. | 101/129 |
| 3,245,341 | 4/1966 | Childress et al. .............. | 101/122 |
| 2,959,153 | 11/1960 | Hider.............................. | 101/DIG. 13 |
| 3,202,560 | 2/1967 | Edwards et al................ | 101/DIG. 13 |
| 3,302,563 | 2/1967 | Edwards ........................ | 101/DIG. 13 |

FOREIGN PATENTS OR APPLICATIONS 81,920  9/1956  Denmark

*Primary Examiner*—Egdar S. Burr
*Attorney*—Robert J. Schaap, John D. Upham and James C. Logomasini

EXEMPLARY CLAIM

1. The method of electrostatically screen process printing articles which have a central axis and an annular surface of revolution about said central axis, with a screen which has a curvilinear surface and can be arcuately shifted about an axis of movement, said screen also being curved with respect to said axis; said method comprising establishing an electrostatic field between said screen and said article, establishing an axis of rotation of said article concentric with its central axis and in a position so that a line of closest approach to said screen is parallel to the curvilinear surface of said screen, rotating said article about its central axis so that the annular surface to receive the ink tangentially approaches, forms an instantaneous elemental line of closest approach and tangentially departs from the screen, arcuately shifting said screen about its axis of shifting movement in timed relation to the rotation of the article so that the curvilinear surface of the screen passes through the elemental line of closest approach, and feeding a quantity of electroscopic ink to said screen in a substantially thin flat line only along the elemental line of closest approach where relative movement exists between the surface of the screen and the thin flat line, said thin flat line being substantially equal to the dimension of the screen which is transverse to the direction of movement of said screen and occupying a small dimensional area of the screen in the direction of movement of the screen, and where the ink is passed through opened areas and propelled by said electrostatic field, thereby causing printing to occur only along the elemental line of closest approach to the screen.

36 Claims, 19 Drawing Figures

Patented May 30, 1972

INVENTORS
JAMES W. EDWARDS
HARRY J. LARRIGAN
SHELLY W. MAYS, JR

BY
Robert J. Schaap
ATTORNEY

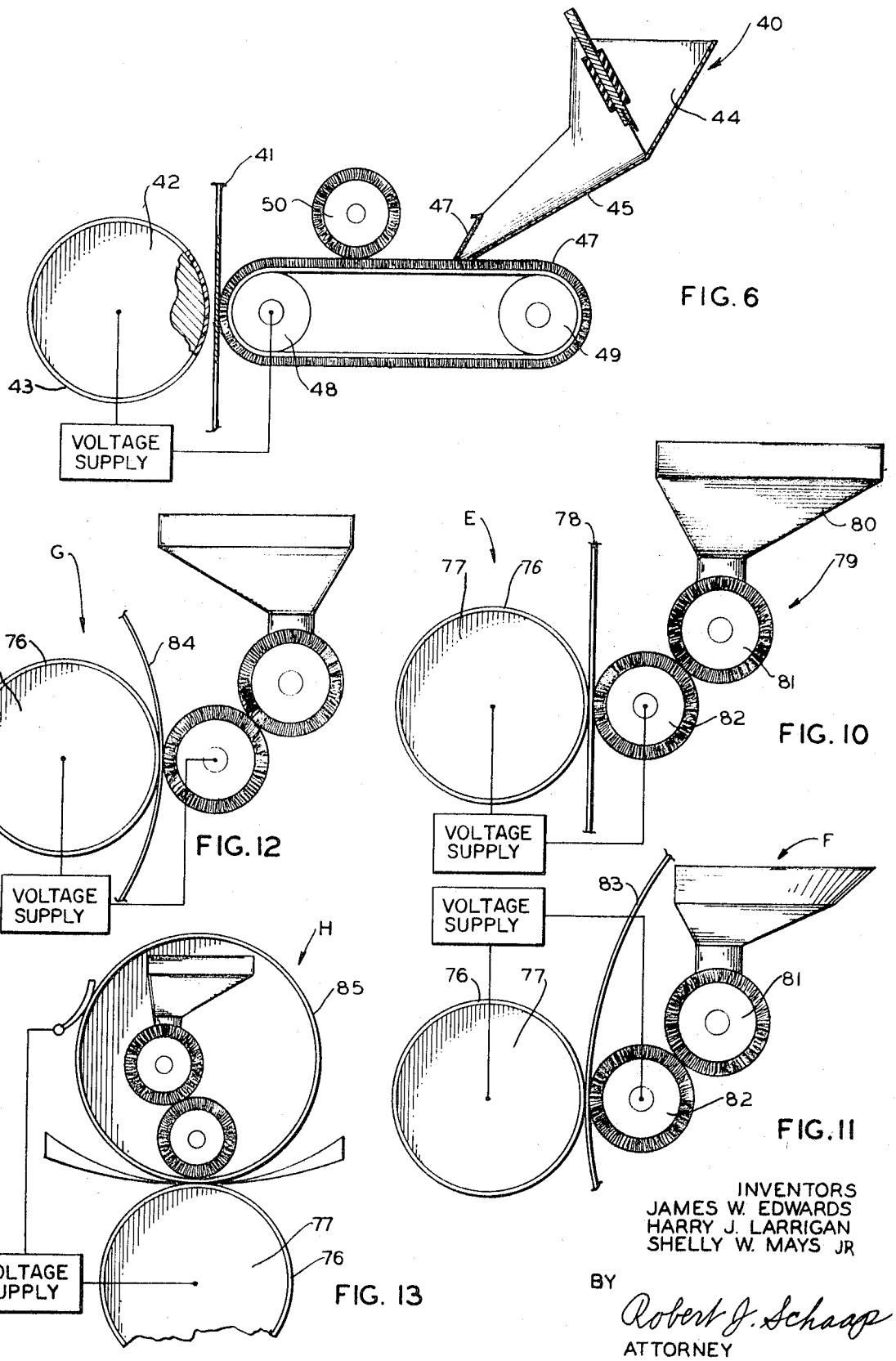

Patented May 30, 1972 3,665,851

INVENTORS
JAMES W. EDWARDS
HARRY J. LARRIGAN
SHELLY W. MAYS JR

BY
Robert J. Schaap
ATTORNEY

Patented May 30, 1972

INVENTORS
JAMES W. EDWARDS
HARRY J. LARRIGAN
SHELLY W. MAYS, JR

BY
*Robert J. Schaap*
ATTORNEY

Patented May 30, 1972

INVENTORS
JAMES W. EDWARDS
HARRY J. LARRIGAN
SHELLY W. MAYS, JR

BY Robert J. Schaap

Patented May 30, 1972

INVENTORS
JAMES W. EDWARDS
HARRY J. LARRIGAN
SHELLY W. MAYS, JR

BY
Robert J. Schapp
ATTORNEY

ELECTROSTATIC SCREEN PROCESS PRINTING

This invention relates in general to certain new and useful improvements in electrostatic printing, and more particularly, to an improved method and apparatus for electrostatically printing on curvilinearly shaped articles.

Since the advent of the thin-walled disposable containers made of plastic and synthetic resinous materials, these containers have found widespread use in the packaging industry. The vending machine industry, particularly, has been employing large quantities of nestable plastic containers in addition to the long-used conventional nestable paperboard containers. It is generally necessary, in this type of industry, to imprint the contents of the container, the name of the manufacturer, and/or distributor, and any other advertising and identification material on the side wall of the container. The conventional printing methods employing offset printing techniques were not generally acceptable, because they were not adapted to mass-production operation at low cost and did not produce a desired quality of print. Because of the low profit margin on disposable containers, profits in this type of field are generally made on a volume sale basis. Accordingly, it is necessary to print containers of this type in an economically feasible manner and the containers must be printed automatically by suitable apparatus.

In an effort to find a suitable method of imprinting containers having frusto-conical shapes and curvilinear shapes in general, there have been certain investigations in the field of electrostatic printing. However, the art of electrostatic printing is relatively new and this particular type of printing was only available for printing on flat or relatively flat items. To date, electrostatic printing techniques have not been adaptable for use in printing on non-linear surfaces of rigid or semi-rigid articles.

The presently known techniques in electrostatic printing are described in U.S. Pat. No. 3,081,698 which relates to a method of electrostatic printing by elimination of pressure or contact between the printing element and the subject material being printed. This technique involves the transfer of a liquid based ink or a resinous based ink through an electrostatic field to an image-receiving media. The ink or pigments are usually in the form of a fine powder having a particle size which is small enough to pass through the interstices or the open areas of a stencil or so-called "screen." A roller or similar mechanical device normally carries the ink particles to a point in close proximity to the stencil and where the ink is carried through the stencil by the electrostatic field to the image-receiving media. When the voltage is applied to the roller or element carrying the pigment, the particles acquire a charge which is that of the stencil or screen. The charge is, of course, opposite to the backing plate and the ink particles are, therefore, accelerated through the openings or interstices in the open areas of the screen and toward the image-receiving media. The image-receiving media may consist of a mandrel which serves as a counter-electrode and which is capable of retaining the article to be printed. Thereafter, the pigment will collide with and adhere to the article which is to be printed and the image is subsequently fixed by heat or solvent or a vapor or by other suitable means which are known in the prior art.

Since the initial development of the concept of electrostatic printing, there have been many attempts to produce devices which are capable of automatic printing. Moreover, there have been attempts to print non-linearly shaped articles by electrostatic methods. However, all of the attempts to produce these automatic and semi-automatic devices for electrostatic printing have been rather unsuccessful and commercially unfeasible for a number of reasons. All of the electrostatic printing devices thus far employed have involved the transfer of ink across a definite and appreciable space and the particles of ink had to be physically transported across this space. However, surface tension effects on the delivery roller often prevented an even and uniform distribution of ink flow.

The devices heretofore available for electrostatic printing were not successfully adaptable for use in electrostatically printing curvilinearly shaped articles such as frusto-conically shaped containers. Curvilinearly shaped articles presented an unusual problem in electrostatic printing due to the fact that each portion of the article to receive electroscopic ink did not lie within the same plane as the ink receiving plane of the electrostatic screen. Consequently, there was a variable distance between the ink receiving media and the electrostatic screen when attempting to print curvilinearly shaped articles. For this reason, attempts to electrostatically print on conically shaped containers such as disposable drinking cups presented particularly difficult problems to overcome. Due to the fact that the ink receiving surface of the conically shaped cup did not lie within the same horizontal plane as every portion of the screen surface, ink delivery was uneven. The printing on these devices suffered areas of reduced color density as a result of uneven ink distribution. These areas of reduced color density have an outline of a printed pattern often referred to as "ghosting" or "memory effect" and materially reduces the aesthetic appearance of the printed image. Moreover, due to the fact that each portion of the ink receiving member did not lie within the same plane, parallel to the plane of the screen, some ink particles had to traverse a greater distance in the electrostatic field and were hence distorted and the ultimate image produced was uneven and smeared.

It is, therefore, the primary object of the present invention to provide electrostatic printing apparatus which are capable of electrostatically printing a large variety of articles having varying sizes and curvilinear shapes.

It is another object of the present invention to provide electrostatic printing apparatus of the type stated which are adaptable for use in mass-production methods of electrostatic printing and do not require employment of specially designed electrodes or devices for altering electrostatic fields.

It is a further object of the present invention to provide methods of electrostatically printing curvilinearly shaped articles which requires minimum amounts of manual attention.

It is an additional object of the present invention to provide electrostatic printing apparatus and methods of the type stated where slight tangential contact can be maintained between the substrate to be printed and the electrostatic screen.

It is also an object of the present invention to provide electrostatic printing apparatus and methods of the type stated where tangential approach and tangential departure is maintained between the substrate and the screen so that printing occurs along an elemental line of closest approach.

It is another salient object of the present invention to provide electrostatic printing apparatus and methods of the type stated employing unique ink delivery systems which are particularly adaptable to curvilinear printing.

With the above and other objects in view, our invention resides in the novel features of form, construction, arrangement and combination of parts presently described and pointed out.

In the accompanying drawings:

FIG. 6 is a schematic view partially broken away and in section of the electrostatic printing apparatus of FIG. 1 with another modified form of ink feeding mechanism constructed in accordance with and embodying the present invention and which employs a vibratory metering system and a rotating distributing belt;

FIG. 10 is a schematic view of a contact electrostatic printing apparatus constructed in accordance with and embodying the present invention and which employs tangential contact between the substrate and a flat screen;

FIG. 11 is a schematic view of a modified form of contact electrostatic printing apparatus which is constructed in accordance with and embodies the present invention and employs a curved screen for tangential contact with a substrate;

FIG. 12 is a schematic view of another modified form of contact electrostatic printing apparatus constructed in accordance with and embodying the present invention and which employs a modified form of curved screen where contact is maintained between the screen and substrate;

FIG. 13 is a schematic end elevational view of an additional modified form of contact electrostatic printing apparatus which is constructed in accordance with and embodies the present invention and which employs a cylindrical screen where tangential contact is maintained between the cylindrical screen and substrate;

Figure 1:
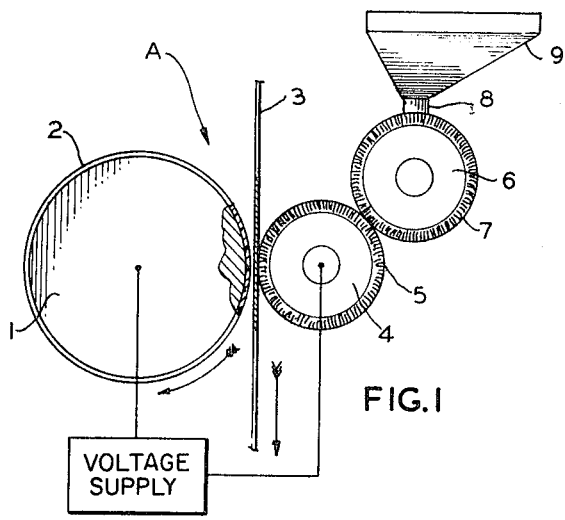
FIG. 1 is a schematic view partially broken away and in section of an electrostatic printing apparatus constructed in accordance with and embodying the present invention and showing tangential departure and approach between a substrate and flat electrostatic screen.
Figure 7:
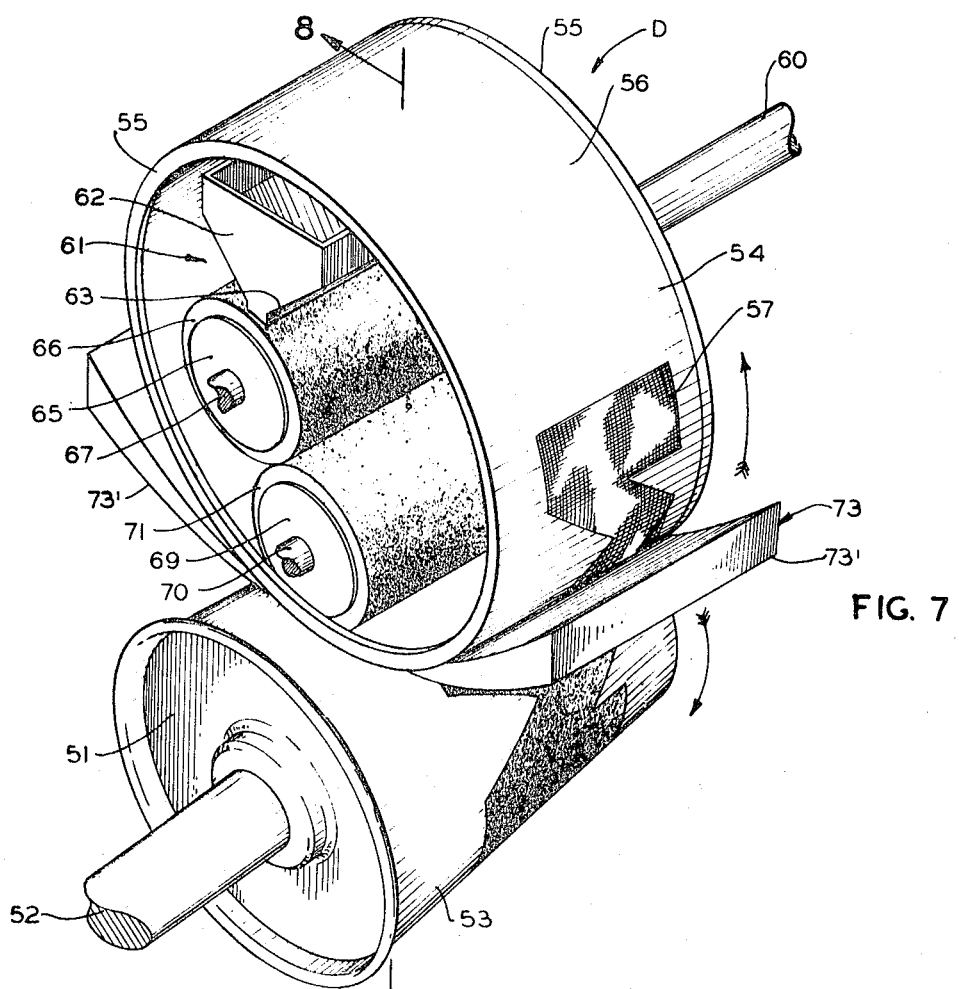
FIG. 7 is a perspective view, partially broken away, of another modified form of electrostatic printing apparatus constructed in accordance with and embodying the present invention and which employs a cylindrical screen.
Figure 19:
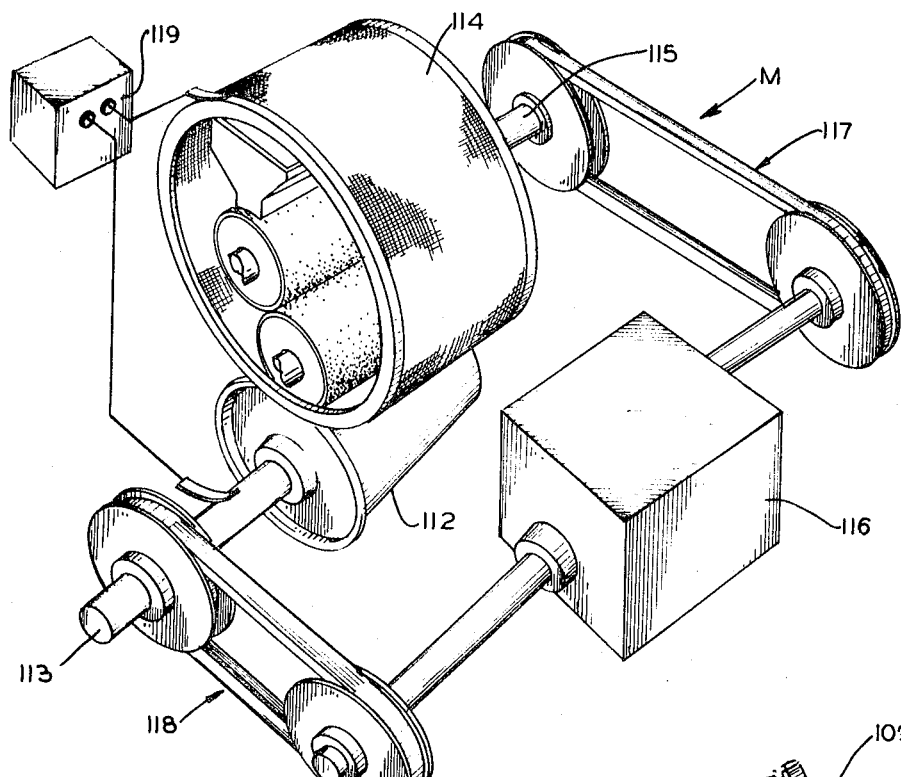
Figure 18:
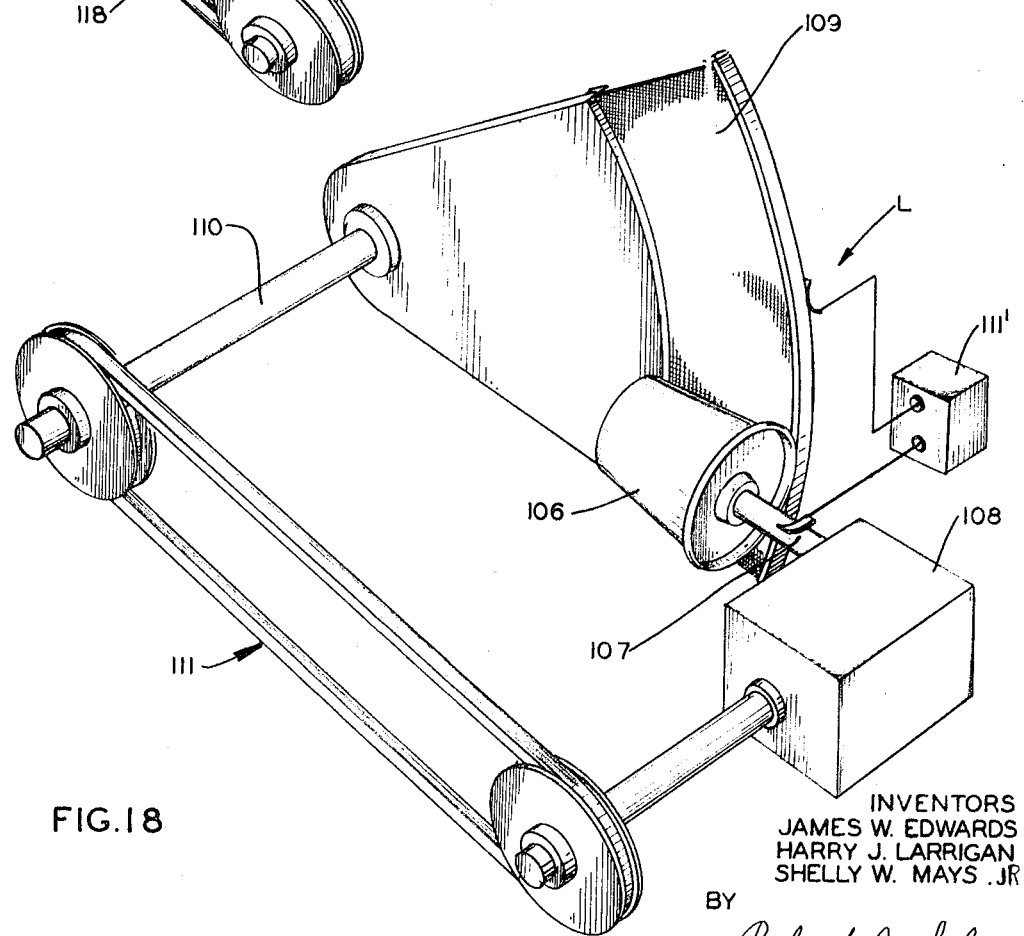

FIG. 18 is a schematic perspective view of an electrostatic printing apparatus substantially similar to the printing apparatus of FIG. 1, and showing the timing relationship between the driving of the screen and mandrel forming part of said apparatus; and FIG. 19 is a schematic perspective view of an electrostatic printing apparatus substantially similar to the printing apparatus of FIG. 7, and showing the timing relationship between the driving of the screen and mandrel forming part of said apparatus.

The art of electrostatic printing is still a recent technological innovation, and the terminology peculiar to this technology has not yet achieved a commonly acceptable and understood usage and definition. Accordingly, the term "printing" as used herein, is employed to describe the operation of a delivery ink from the ink member to the element being printed, although it is to be understood that the word "printing" as used herein does not connote any mechanical pressure. The word "printing" is used in its much broader sense of the word merely to mean transfer of a design from one element to another in analogous form to the use of the term "printing" in photography where mechanical pressure is not the cause of transference of the design. In interpretation of the specification and the following claims, all terminology borrowed from the conventional printing art must, therefore, be given a broad meaning appropriate to this specialized field of electrostatic printing.

GENERAL DESCRIPTION

Generally speaking, the ink feeding apparatus of the present invention is designed for use in mass-production electrostatic printing systems of the type described in copending patent application Ser. No. 482,447 filed Aug. 25, 1965, now U.S. Pat. No. 3,302,579. An electrostatic printing system of the type with which the present apparatus can be employed contains an electrically charged mandrel or counter-electrode, and an electrically charged screen, the latter having a suitably imprinted pattern for creating the desired printed image and an electrically charged ink delivery mechanism. The stencil or screen generally comprises a fine mesh element of conductive material having masked non-printing areas. The ink particles are sized to pass through the interstices of the non-masked areas and carried by an electrostatic field to the mandrel or counter-electrode and thereby deposited on the article which is retained on the mandrel or counter-electrode.

The apparatus of the present invention provides for electrostatic deposition of electroscopic ink on surfaces having conical or cylindrical shapes. Slight modification of the present apparatus provides for electrostatic deposition of electroscopic ink on articles having almost any type of curvilinear shape. The apparatus generally comprises an electrostatic screen and an electrode of suitable size and shape to hold the substrate or material which is to receive the electroscopic ink. For the purposes of the present invention, the substrate involved is generally a container such as a thin-walled plastic container, a disposable drinking cup, a flower pot, food container, etc. However, it should be understood that the present invention is not limited to the above and practically any type of container having curvilinear surfaces can be used in the practice of the present invention. The electrostatic screen of the present invention may be flat and is preferably mounted within a fairly rigid frame to withstand distortion during shifting movement. The electrode upon which the container is mounted must be capable of rotation so that the exterior of the wall which is to be printed provides tangential approach with the screen and tangential departure therefrom so that printing occurs along an elemental line of closest approach. The screen oscillates in a plane which is substantially parallel to this elemental line of closest approach or tangential printing line. Moreover, the screen is shifted or oscillated at approximately the same rate of speed of the rotation of the container so that a continuing line of tangency occurs between the surface of the container and the surface of the screen. Simultaneously with the rotation of the screen and the container, electroscopic ink particles are moved toward and through the screen to the container by the electrostatic field. The ink particles are passed through the screen along this line of tangency. In this manner, it is possible to provide electrostatically printed images on the surface of a curvilinearly shaped article such as a conically shaped container.

In a modified form of apparatus constructed in accordance with the present invention, a curved screen can be substituted for the flat screen. The curved screen is rotated about an axis or oscillated through an arc, the axis of rotation or pivotal movement being somewhat coplanar to the axis of rotation of the container and the line of ink delivery. The axis of rotation or oscillation of the curved screen may be on the same side of the screen as the axis of rotation of the container, or it may be on the opposite side of the screen with respect to the axis of rotation of the container. The present invention provides the possibility of electrostatic printing on a wide variety of curvilinear shapes such as conically shaped articles and hyperbolically shaped articles for example. The screen is designed to have a substantially similar surface contour to the surface being printed for printing on curvilinear surfaces.

The curved screen must have a surface contour in at least one plane which is substantially identical to at least a portion of the surface contour of the container. In the conically shaped container, a portion of the wall generates continuous flat lines about its central axis. An arcuately shaped screen similarly generates a series of flat lines which are parallel to each other in the arcuate plane of rotation or oscillation. These flat lines generated by the exterior surface of the container will be parallel in space to the flat lines generated by the screen in at least one plane. Therefore, it can be seen that the axis of rotation of the container is such that the exterior wall thereof which is to be printed tangentially approaches and tangentially departs from the screen so that printing occurs along an elemental line of closest approach. The container is rotated at approximately the same rate of speed as the movement or rotation of the screen, through this line of closest approach, so that a continuing line of tangency occurs between the surface of the container and the surface of the screen. Simultaneously with the movement of the screen and the rotation of the container, electroscopic ink particles are moved toward and through the screen along the elemental line of closest approach to the container by means of the electrostatic field.

The axis of rotation of the conically shaped container lies in at least one plane with the elemental line of closest approach such as the horizontal plane; but the axis of rotation of the container is not parallel in space to the elemental line of closest approach. The axis of rotation of the container and the elemental line of closest approach will intersect at a point in space which is ideally the point from which a cone is generated about the axis of rotation, the elemental line of closest approach lying within the side wall of the cone.

It can be seen that as a modification of the above, printing is also possible on regularly shaped articles such as cylindrical containers. In articles which have the surface to be printed and the surfaces are generated around an axis of rotation, and all points on the surface are equidistant from the axis of rotation, then the axis of rotation of the article is parallel in space to the plane of oscillation of a flat screen or axis of rotation or oscillation of a curved screen. It is also possible to print by the electrostatic screen process principle on other types of curved articles. For example, electrostatic printing is possible on regularly and irregularly shaped hyperbolic articles. The necessary criterion is that the screen employed must have a surface contour in at least one plane which is substantially identical to at least a portion of the surface contour of the container. In the regular hyperbolic article where the article is symmetrical about an axial centerline and symmetrical about a radial centerline, the axis of rotation of the article will be parallel in space to the plane of oscillation of a flat screen or parallel in space to the axis of rotation or oscillation of a curved screen. In the case of an irregular hyperbolic shaped container, where the container is symmetrical only about its axial centerline, the axis of rotation of the container will not be parallel in space to the plane of oscillation of a flat screen or the axis of of rotation or oscillation of a curved screen. The axis of rotation of this latter type of container will be so located so that the curved surface of the wall of the container will match a curved surface of the screen whether or not the screen is flat or curved itself. Moreover, the exterior wall of the container will tangentially approach and depart from the curved portion of the screen so that printing will occur along an elemental line of closest approach. Again, the container is rotated at the same rate of speed as the movement of the screen through the line of closest approach so that a continuing line of tangency occurs between the surface of the container and the surface of the screen.

By employment of tangential approach and departure between the substrate and the screen, it is possible to provide electrostatic contact printing where contact exists between the substrate and the screen. Moreover, contact can exist between the feeding mechanism such as a feed roller and the screen; so that in effect, contact is maintained between the substrate, the screen and the feeding roller. In the case of electrostatic printing, a shield interposed between the substrate and the screen and having a relatively small slit along the line of continued tangency between the substrate and the screen is desirable to prevent "ghosting" effects. The contact electrostatic printing techniques may also employ the flat screen which oscillates in timed relation to the rotation of the substrate, or either of the curved screens which rotate in timed relation to the rotation of the substrate.

The present invention also provides a modified form of ink feeding mechanism which replaces the roller feeding mechanism and is particularly adaptable for use in curvilinear electrostatic printing of a curvilinearly shaped article. This feeding mechanism employs a series of wires located in the discharge path of a feed hopper containing electroscopic ink. A vibratory mechanism creates vibration in the wires, thereby permitting selected quantities of electroscopic ink to pass therethrough. In a modified form of feeding mechanism provided by the present invention, an air feed used to carry the particles from an ink hopper is employed. The air creates the media of movement or transportation and propels the particle through a chamber toward the screen. The air feed creates sufficiently turbulent conditions so that the electroscopic ink particles are propelled against the walls of the chamber through which they pass and are thereafter triboelectrically charged.

The present invention also provides an electrostatic printing apparatus of the type described which employs a cylindrical screen suitably mounted within a screen frame. The cylindrical screen is sufficiently large so that it houses a suitable feeding mechanism such as a roller feeding mechanism, one of the rollers constituting a feed roller which remains in contact with the interior surface of the cylindrical screen. A mandrel which constitutes a counter-electrode is disposed in tangential contact with the screen and is designed to retain a container or suitable substrate to receive electrostatic print. The axis of rotation of the mandrel is so located that the exterior wall of the container provides a continuing line of tangency between the screen and the container disposed on the mandrel or the counter-electrode. The container is again so located so that it provides tangential approach with the screen and tangential departure therefrom so that printing will occur along this elemental line of continuing tangency or line of closest approach. Again, the container is rotated at approximately the same rate of speed as the rotation of the screen so that the continuing line of tangency is maintained, and ink particles are passed through the screen along this line or band of tangency. A mask having a narrow printing slit at the line of tangency may also be interposed between the substrate and the screen.

DETAILED DESCRIPTION

Referring now in more detail and by reference characters to the drawings which illustrate practical embodiments of the present invention, A designates an electrostatic printing apparatus which generally comprises a mandrel or counter-electrode 1 which supports a cup or similar thin-walled container 2. The apparatus as schematically shown in FIG. 1 also comprises an electrostatic screen or so-called "stencil" 3 which is preferably retained on a fairly rigid screen frame (not shown). The screen 3 is preferably of the type which contains masked non-printing areas and printing areas where the screen permits flow of electroscopic ink therethrough. The screen 3 and the frame may be of the type described in my copending application Ser. No. 463,109, filed June 11, 1965, now U.S. Pat. No. 3,302,560, and is, therefore, not described in detail herein. However, it is pointed out that the screen frame oscillates and shifts for a distance which is a substantial fraction of the length of the screen 3 during each printing cycle.

It has been found in connection with the present invention that a very effective type of screen which can be employed in electrostatic printing operations of this type is a stainless steel screen with 250 wires to the inch in square array. The screen or so-called "stencil" is coated with a photosensitive material or so-called "resist." This coating is applied so that it spans all the interstices in the screen. The sensitized screen is then exposed to an ultraviolet light through an interposed positive image of the desired copy for a proper length of time to harden the area where the interposed image transmits light. Thereafter, this coated screen is then developed and the development will dissolve away the areas of the material which were protected from light by the opaque areas of the film image, thereby leaving a solid mass in the areas affected by the light.

Various methods of preparing the screen can be used. It is only necessary that the non-printing area be effectively masked to prevent the movement of pigment therethrough in subsequent electrostatic printing operations. This is accomplished very well by various known methods as well as the use of photosensitive coatings on the open mesh. Techniques familiar in the screen-silk process printing may also be employed in the production of stencils or screens for electrostatic printing operations. It is not necessary to have the regularity of openings of a fine mesh screen or sensitized net. The regular openings in fibrous materials and the like can be satisfactory as long as the openings in the particle size of the pigment are compatible for movement therethrough.

By further reference to FIG. 1, it can be seen that there is a definite and appreciable space between the container 2 and the screen 3. On the opposite side of the screen 3 with respect to the mandrel 1 is a feeding or inking roller 4 which is provided on its annular surface with a pile fabric material 5, the latter of which resides in facewise contact with the surface of the screen 3. The fabric 5 may be secured to the roller 4 by any suitable adhesive and is preferably of a relatively thick bristle brush construction, such as a mohair pile fabric. It has also been found that when the fabric 5 is formed of a foamed elastomer material, very effective results have been attained. The fabric 5 is not necessarily limited to the above materials inasmuch as the important criterion in selection of the fabric 5 is that the material must have a sufficient number of cavities or interstices into which ink powder can be deposited and subsequently transferred to the screen 3. The fabric 5 must also have a different triboelectric charging potential than the ink which is selected for use in the printing operation.

The inking or feeding roller 4 also serves as an electrode and establishes an electrostatic field between the mandrel 1 which serves as the counter-electrode and the inking roller 4. The electrostatic field between the mandrel 1 and the feeding roller 4 is developed by a variable high potential source (not shown). This source is adapted to develop a relatively high direct current potential. While the current requirements for electric printing of the type herein employed are not heavy in the ordinary sense, a very definite electron current or space current flows across the printing space during the printing operation. It is desirable to have a space current of at least 1 to 2 milliamperes per square inch of printing area. Moreover, the high potential source should be capable of maintaining a desired voltage under current drains in the range of approximately 100 milliamperes or slightly more.

Operatively mounted in contact with the fabric 5 of the roller 4 is a distributor roller 6 having a fabric surface 7, the latter of which is similar to the fabric surface 5 and may be formed of identical material. The roller 6 is disposed beneath and in contact with the discharge outlet 8 of an ink hopper 9, all as can best be seen in FIG. 1. The bristles of the fabric 7 are sized to extend into the slot forming part of the discharge outlet 8 and thereby act as an effective sealing means for the hopper or ink chamber 9. Thus as the roller 6 rotates, it will pick up selected quantities of ink and transfer the ink to the feeding roller 4, which will, in turn, transfer the ink to the screen 3. This type of feeding mechanism is more fully described and illustrated in my copending application Ser. No. 453,706 filed May 6, 1965. The hopper 9 may be formed of any suitable synthetic resin or plastic material but is not necessarily limited to these materials and may be formed of any material which is inert with respect to the ink.

Any of a variety of electroscopic inks can be employed in the present invention. Generally, the electroscopic inks comprise a finely dispersed powder which is capable of being triboelectrically charged. The powder generally carries a desired pigment. A number of satisfactory powders can be employed in the present invention and each must be in a finely divided state. Suitable powders are dyed thermoadhesive resins such as rosin, gum copal, gum sandarac, ethyl cellulose, Egyptial asphalt, various synthetic resins and the like. A very satisfactory thermoadhesive powder can be produced by dissolving equal parts of ethyl cellulose and Vinsol resin in acetone together with a small amount of spirit soluble aniline dye such as Nigrosine or aniline blue and spray drying the solution to produce an extremely fine powder having substantially spherical particles. Dyed Lycopodium powder is suitable where thermoadhesive properties are not required of the powder, as is also starch, cellulose flour, powdered metal and copper powder.

The electroscopic ink is maintained in a fluidized state or so-called "fluid state" and may be fluidized by any conventional process such as passing low pressure air through a porous membrane on which the ink particles are maintained in combination with a vibratory action. The ink contained within the hopper 9 must, therefore, be maintained in the fluidized state. For this purpose, the hopper 9 is generally provided with some suitable agitator means for keeping the ink particles in a suspended or levitated state.

Whether fusible, thermoadhesive or non-fusible powders or others are used, the particle size is preferably near the limit of definition of the eye under ordinary reading conditions. Excessive powder size contributes to graininess in appearance of the image. On the other hand, extremely fine powder may be undesirable in many instances due to its tendency to "ball up" or cling together in clusters. It is, therefore, desirable to use a powder in which substantially all the particles are within the size range from 0.5–25 microns. If spherical powders are used, this refers to their diameters, otherwise to the largest dimension. For most purposes, it is preferred to use an equi-dimension powder particle, the sphere being the preferred form.

By further reference to FIG. 1, it can be seen that the fabric 7 on the distributor roller 6 picks up ink from the hopper 9 as it rotates and transfers the ink particles to the fabric 5 on the feeding roller 4. An additional roller (not shown) may be employed for triboelectrically charging the particles. The particles, however, can be charged in any conventional manner as may be desired or by any suitable means of triboelectric charging. Moreover, the particles can be charged by means of a corona discharge. The ink particles which are then transferred to the feeding roller 4 are passed to the screen 3 where they are suspended in the electrostatic field and transferred to the container 2 by the propelling force of the electrostatic field. It can be seen that the mandrel 1 and the container 2 disposed thereon rotates in the direction of the arrow, that is a clockwise direction, whereas the ink feeding roller 4 rotates in a counter-clockwise direction, when the screen 3 is shifted in a downwardly direction (reference being made to FIG. 1). Similarly, the mandrel 1 would rotate in a counter-clockwise direction and the feeding roller 4 would rotate in a clockwise direction when the screen 3 is shifted upwardly, (reference being made to FIG. 1).

The container 2 is so positioned so that selected increments of a line on the surface of the container which is closest to and tangent to the screen 3 may be equidistantly spaced from the screen 3. The screen 3 and container 2 each have a substantially identical surface contour in at least one plane, that is a plane passing through the axis of rotation of the container and axis of pivotal movement of the screen, since each have a flat line which is parallel in that plane. Thus, the mandrel 1 and the container 2 mounted thereon is so positioned so that the exterior wall provides a tangential approach and departure to the screen so that printing will occur along an elemental line of closest approach. Moreover, the mandrel 1 and the screen 3 is shifted at approximately the same relative rate of speed so that the continuing line of tangency is maintained between the surface of the container and the surface of the screen. Thus as the screen shifts downwardly and the mandrel 1 and container 2 are rotated in a clockwise direction, a new portion of the outer surface of the container 2 always presents itself in a tangential relationship to a new portion of the pattern on the screen 3. Thus, it can be seen that the ink particles which are supplied by the feeding roller 4 are passed through the screen at the point of tangency with the container 2 and along this line or band of tangency. The band of printing is substantially equal to the width of the printing image, that is the horizontal dimension of the printed image. Moreover, the band is relatively narrow in the vertical dimension, reference being made to FIG. 1, so that the printed image is a continuation of a series of continuous lines of print. If desired, a shield having a relatively narrow band is interposed between the mandrel and the screen 3. The shield is provided with a slit which is substantially equal to the width of the substrate and has a height within the range of 0.25 to 1 inch, depending on the diameter of the mandrel 1. The shield may be constructed of any material which will not interfere with the electrostatic field, but which is sufficient to stop the movement of particles across the electrostatic field.

Figure 2:
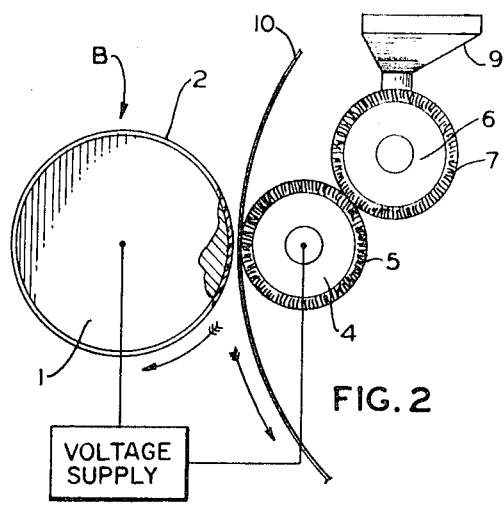
FIG. 2 is a schematic view partially broken away and in section of a modified form of electrostatic printing apparatus constructed in accordance with and embodying the present invention and illustrating tangential departure and approach between a substrate and a curvilinear electrostatic screen.

It is possible to provide a modified form of electrostatic printing apparatus B substantially as shown in FIG. 2 and which employs a curved screen 10 in place of the flat screen 3 in the apparatus A. The remainder of the electrostatic printing apparatus B is substantially similar to the previously described printing apparatus A. However, the screen 10 in the apparatus B rotates or oscillates about an axis in timed relation to the rotation of the mandrel 1 rather than moving in a single plane in timed relation to the rotation of the container. The axis of rotation or oscillation is on the opposite side of the screen 10 with respect to the mandrel 1 so that the two arcuate surfaces present themselves in tangential approach and departure as the screen 10 and the mandrel 1 rotate. In the apparatus B, if the mandrel 1 is rotated in a clockwise direction, the screen 10 would be rotated or oscillated in a counter-clockwise direction. However, if the mandrel 1 is rotated in a counter-clockwise direction, the screen 10 will be rotated or oscillated in a clockwise direction, reference being made to FIG. 2. It can thus be seen that the screen has a surface contour in at least one plane which is substantially identical to at least one portion of the surface contour of the container. In this conically shaped container, a portion of the wall generates continuous flat lines about its central axis. The arcuately shaped screen similarly generates a series of flat lines which are parallel to each other in the arcuate plane of rotation or oscillation. These flat lines generated by the exterior surface of the container are parallel in this plane of space to the flat lines generated by the screen in at least one plane. Therefore, it can be seen that the axis of rotation of the container is such that the exterior wall thereof, which is to be printed, tangentially approaches and tangentially departs from the screen so that printing will occur along an elemental line of closest approach. The container is rotated at approximately the same rate of speed as the rotation or oscillation of the screen, through this line of closest approach so that a continuing line of tangency occurs between the surface of the container and the surface of the screen.

From a study of the geometrical relationship of the container and curved screen, it can be seen that the axis of rotation of the conically shaped container lies in the same plane as the elemental line of closest approach; but the axis of rotation of the container is not parallel in space to the elemental line of closest approach. Moreover, the axis of rotation will intersect the elemental line of closest approach at a point in space which is the point from which a cone is generated about the axis of rotation and where the elemental line of closest approach will lie within the side wall of the cone. It can further be seen that simultaneously with the movement of the screen and the rotation of the container, electroscopic ink particles are moved toward and through the screen along the elemental line of closest approach to the container by means of the electrostatic field established therebetween. Naturally, in the areas where the screen is masked, the electroscopic ink particles will not pass through. The particles that pass through the open portions of the screen form the desired image on the container 2 as the screen 10 and container 2 rotate.

The screen 10 may be manufactured or produced in the manner as described in my copending application Ser. No. 463,251 filed June 11, 1965. In this method, a photosensitive emulsion is applied to a wire mesh support and held in a screen chase. The screen is then exposed to light through a photographic negative of the required print or design to be ultimately imprinted upon a substrate. A washout of the exposed emulsion leaves a positive image on the screen which can be subsequently converted to a negative image required for printing by means of electroplating. The plating adheres preferentially to the open mesh portions of the screen. Subsequent treatment with an emulsion remover such as hydrogen peroxide and various acid etches will clear the print areas leaving a negative screen in which the non-print areas have interstices filled with metal. The plating metal is chosen to give a final screen which is rigid but formable by various forming methods such as rolling and drawing. The final screen thereafter can be shaped into a desired surface which will parallel complex surfaces to be printed.

Figure 3:
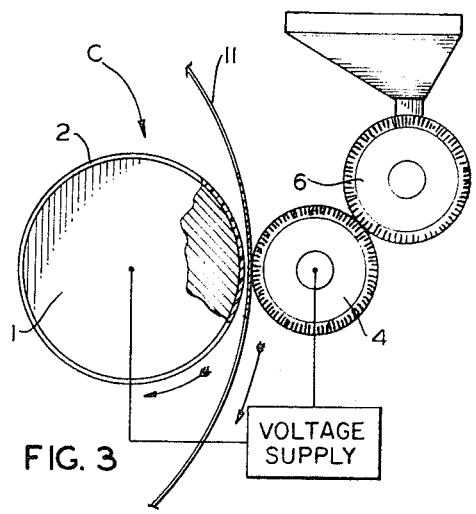
FIG. 3 is a schematic view partially broken away and in section of another modified form of electrostatic printing apparatus constructed in accordance with and embodying the present invention and which illustrates a modified form of curved electrostatic screen.

It is possible to provide another modified form of electrostatic printing apparatus C substantially as shown in FIG. 3 and which is substantially similar to the previously described electrostatic printing apparatus B. The apparatus C similarly provides a curved or arcuately shaped screen 11, which is similar to the screen 10 except that the axis of rotation or oscillation of the screen 11 lies on the same side of the screen 11 as the axis of rotation of the mandrel 1. Again, the screen 11 may be either oscillated or rotated. The mechanism for oscillating or rotating the screen 11 is conventional, and is, therefore, neither illustrated nor described in detail herein. However, it can be seen that the screen 11 resides in facewise contact with the fabric 5 on the roller 4 and is designed to receive a supply of ink from the feeding roller 4. It can also be seen that the axis of rotation of the container 2 is located so that the exterior wall thereof, which is to receive the electrostatic print, tangentially approaches and tangentially departs from the screen so that printing will occur along an elemental line of closest approach. Furthermore, the container is rotated at approximately the same rate of speed as the rotation or oscillation of the screen through this line of closest approach so that a continuing line of tangency occurs between the surface of the container and the surface of the screen. Feeding of the electroscopic ink also occurs during the movement of the screen and rotation of the container along the elemental line of closest approach by means of the force of the electrostatic field.

By further reference to FIG. 3, it can be seen that the axis of rotation of the conically shaped container lies in the same plane as the elemental line of closest approach, that is a substantially horizontal plane. However, the axis of rotation of the container is not parallel in a spatial relationship to the elemental line of closest approach.

Figure 4:
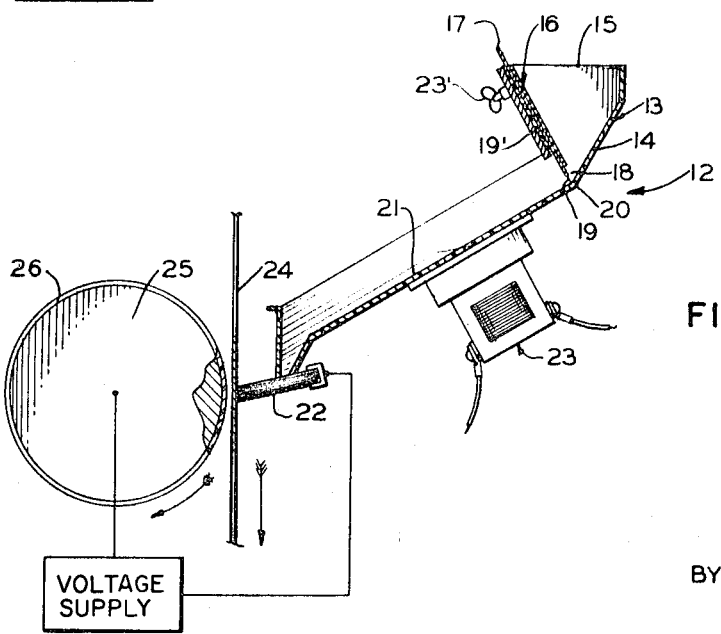
FIG. 4 is a schematic view partially broken away and in section of the electrostatic printing apparatus of FIG. 1 with a modified form of ink feeding mechanism which is constructed in accordance with and embodying the present invention.

FIG. 4 illustrates a modified form of ink feeding mechanism 12 of the type described in copending application Ser. No. 494,165, filed Oct. 8, 1965, now U.S. Pat. No. 3,320,879 and which can be employed with the electrostatic printing apparatus of the present invention. The ink feeding mechanism 12 thus illustrated replaces the roller and hopper system illustrated in FIGS. 1-3. The ink feeding mechanism 12 generally comprises a hopper 13 constructed of a plastic or synthetic resinous material, and generally of the same material which is used in the construction of the hopper 9. The ink hopper 13 is somewhat funnel-shaped and is provided with a rear wall 14 and side walls 15. The front wall is formed by a gate mechanism 16, which comprises a shiftable plate 17 having an arcuate slot 18 for accommodating a series of longitudinally spaced, relatively heavy and rigid spring wires 19, which are capable of being vibrated. The plate 17 is provided with a rubber bushing 19' on its interior surface to permit the desired degree of vibration of each of the wires 19. Moreover, by further reference to FIG. 4, it can be seen that the wires 19 terminate very closely near the wall 14, thereby forming a feeding slot or discharge slot 20. The wall 14 at the point of the slot 20 is connected to a discharge trough or chute 21, which carries ink particles to a vibrating plate 22. Mounted on the underside of the trough 21 is a conventional vibrating mechanism 23 which is suitably connected to a source of electrical current (not shown) for creating a vibratory condition on the hopper 13. A conventional mechanism for regulating the amount of voltage to the vibrator 23 may be provided in order to regulate the amount of vibration. This mechanism for regulating voltage and the vibrator itself are neither illustrated nor described in detail inasmuch as these elements are conventional in their construction. Furthermore, the degree of vibration of the wires may be regulated by adjusting the position of the plate 17. The positioning of the plate 17 can be performed by means of a locking key 23'. Thus by shifting the plate 17, a greater or lesser length of the wires 19 may be obtained. The length of the wires 19 is, of course, proportional to the degree of vibration attained and the degree of vibration is proportional to the amount of feed which is permitted to pass through the discharge slot 20.

The trough 21 is inclined and carries the ink particles which are discharged from the hopper 13 to the discharge end where they are deposited on the vibrating plate 22. The vibrating plate 22 is similarly inclined but at less of an acute angle with respect to the horizontal than the trough 21. The plate 22 may be connected to the discharge end of the trough 21 by a fairly rigid structure so that it similarly is vibrated with the trough 21 through the action of the vibrator 23. However, it should be understood that a vibrator similar to the vibrator 23 may be mounted on the underside of the plate 22, creating an independent vibratory action.

By further reference to FIG. 4, it can be seen that the plate 22 terminates at a point in very slight contact with the surface of a flat screen 24. The screen 24 is substantially identical to the previously described screen in the apparatus A and is designed to oscillate in each printing cycle. Similarly mounted on the opposite side of the screen 24 is a mandrel 25 designed to retain a suitable conically shaped container 26, such as a thin-walled disposable plastic container. Printing on the container 26 is performed by the same method and in the same manner as printing on the container 2 in the apparatus A. The axis of rotation of the container 26 is such that the exterior wall which is to be printed tangentially approaches and tangentially departs from the screen 24 so that printing will occur along an elemental line of closest approach. By further reference to FIG. 4, it can be seen that this elemental line of closest approach lies in a horizontal plane which passes through the axial centerline of the mandrel 25. Furthermore, it can be seen that printing will occur along this elemental line of closest approach. The container is rotated at approximately the same rate of speed as the movement of the screen and through this line of closest approach so that the continuing line of tangency will occur between the surface of the container 26 and the surface of the screen 24.

The vibratory feeding plate 22 terminates in approximately the same horizontal plane as this continuing line of tangency between the screen 24 and the container 26. In fact, as previously indicated, the plate 22 is in very slight contact with the screen so that the ink particles which are deposited on the plate 22 are vibrated off of the plate 22 at the point of contact with the screen 24 where the particles are then carried by the electrostatic field to the container 26. Thus, it can be seen that the ink particles are deposited on the screen 24 at this elemental line of closest approach where they can be carried by the electrostatic field to the container 26.

The plate 17 is preferably insulated from the remainder of the hopper 13, and the terminal ends of the wires 19 are connected to a source of high voltage electrical current (not shown). Thus, current is supplied to the wires 19 to provide a corona discharge so that the ink particles passing between the wires 19 are electrically charged. By this process, it is possible to eliminate the necessity of triboelectrically charging the ink particles before they are admitted to the electrostatic field.

Figure 5:
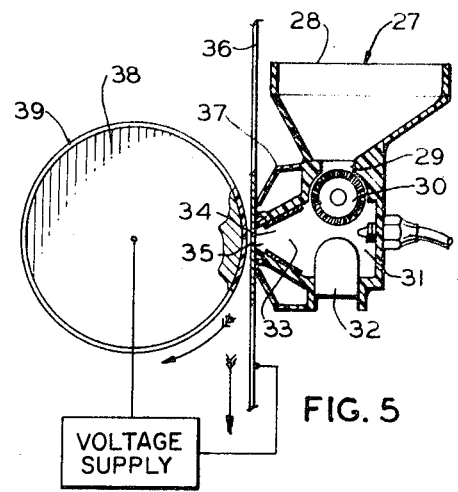
FIG. 5 is a schematic view partially broken away and in section of the electrostatic printing apparatus of FIG. 1 which employs an air operated ink feeding mechanism and which is constructed in accordance with and embodies the present invention.

FIG. 5 illustrates another modified form of feeding mechanism 27 which can be employed with the electrostatic printing apparatus of the present invention. The electroscopic ink feeding mechanism 27 operates on an air delivery principle and is more fully illustrated and described in copending application Ser. No. 461,044 filed June 3, 1965, now U.S. Pat. No. 3,302,563. The air delivery operated feed mechanism 27 has been found to be particularly useful for printing of curvilineary shaped articles inasmuch as the use of the mechanical feed system for transferring ink particles often creates undesirable conditions in that heat and friction have been generated at the place of contact between the mechanical mechanism such as the rotating brush or other transfer media. The ink particles which are used in electrostatic printing system are thermoplastic in nature, and, therefore, are quite sensitive to both heat and pressure with regard to softening and fusing.

The ink feeding mechanism 27 generally comprises a hopper 28 which is substantially similar to the previously described hopper 9, and is designed to contain any desired type and particle size of electroscopic ink. Preferably rotated in the hopper 28 is an agitator for keeping the ink particles in a suspended or levitated state. The hopper 28 is preferably formed with a discharge slot 29 and operatively mounted beneath the hopper and extending upwardly through the discharge slot 29 is a distributor roller 30 having a pile fabric outer surface. The fabric 30 is formed of a relatively thick brush-like material, such as a mohair pile fabric. It can be secured to the annular surface of the roller 30 in any conventional manner such as by a suitable adhesive. It has been found in connection with the present invention that when the fabric is formed of a foamed elastomer material, very effective results have been obtained. The fabric is not necessarily limited to the above material inasmuch as the important criterion in selection of the fabric is that the fabric must be capable of sealing the discharge slot 29 and yet have a sufficient number of cavities or interstices into which the ink powder can be deposited and subsequently transferred. It has also been found desirable to provide a fabric with a different triboelectric charging potential than the ink which is selected for use in the electrostatic printing system.

Thus, as the distributor roller 30 rotates, it will pick up a charge of ink and deposit the same in the interstices of the pile fabric on the roller 30. The rotation of the distributor roller 30 will cause the ink to become deposited in a transfer area 31 which is maintained by an adjustable plug 32, disposed beneath the distributor roller 30. The transfer area consists of a space between the plug 32 and distributor roller 30 where the electroscopic ink is carried by a stream of air. The transfer area 31 is formed in an ink delivery tube 33 and is carried in a stream of air which is forced into the delivery tube 33. Air is supplied from a conventional source of air pressure (not shown). The air which is forced past the transfer zone picks up the ink deposited by the roller in the transfer zone or carries the particles from the interstices of the fabric on the roller 30 and propels the same through the ink delivery tube 33. The plug 32 is preferably adjustable in its position in order to regulate the air gap forming the transfer zone 31.

The ink particles are then propelled through the delivery tube and into a charging chamber 34 where they are propelled against a metallic shield forming the interior portion of the charging chamber. Constant bombardment against this metallic shield will create a triboelectric charging of the ink particles. In order to provide additional charging of the ink particles, a series of longitudinally spaced transversely extending corona discharge wires may extend across the delivery tube in order to provide charging of the ink particles as they pass therethrough.

The delivery tube 33 terminates in a feed nozzle 35 having a discharge aperture at its end which resides in slightly spaced relation to a screen 36, the latter being substantially identical to the previously described flat screen 3. The feed nozzle 35 is relatively flat in the vertical dimension, thereby providing a narrow band of ink particles and is approximately as wide as the printing area of the screen 36. Furthermore, an exhaust manifold 37 is disposed about the feed nozzle 35 for withdrawing excess ink particles from the area of transfer between the feed nozzle 35 and the screen 36.

Thus, it can be seen that the electroscopic ink is fed in a narrow band. A mandrel 38 is positioned on the opposite side of the flat screen 36 and is designed to retain a container 39. The axis of rotation of the container is such that the exterior wall thereof, which is to be printed, tangentially approaches and tangentially departs from the screen so that printing occurs along an elemental line of closest approach. Again, the container is rotated at approximately the same rate of speed as the oscillation of the screen through this line of closest approach so that a continuing line of tangency occurs between the surface of the container and the surface of the screen. It can also be seen that the ink particles are delivered to the screen at this continuing line of tangency. Therefore, simultaneously with the movement of the screen and rotation of the container, electroscopic ink particles are moved toward and through the screen along this elemental line of closest approach to the container by means of the electrostatic field established between the container 39 and the screen 36.

FIG. 6 illustrates an additional modified form of ink feeding mechanism 40 of the type described in said copending application Ser. No. 494,165, filed Oct. 8, 1965, now U.S. Pat. No. 3,320,879, and which can be used with the electrostatic printing system of the present invention. The ink feeding mechanism 40 is used with an electrostatic printing apparatus having a flat screen 41 which is substantially identical to the previously described flat screen 3 and which is designed to be used in an apparatus printing on conically shaped containers 42 removably disposed on a mandrel 43. The feeding mechanism 40 generally comprises a hopper 44 with a vibrating system of the type described in the feeding mechanism 12. Therefore, this portion of the feeding mechanism 40 is not described in detail in connection with this modification. However, the hopper 44 is connected to a trough 45 having a discharge end 46 which is designed to discharge electroscopic ink particles on a continuously rotating belt 47. The belt 47 is trained about a pair of rollers 48,49, the roller 48 which also serves to create the electrostatic field between the roller 48 and the mandrel 43. This type of feed mechanism is more fully illustrated and described in aforementioned copending application Ser. No. 494,165, filed Oct. 8, 1965, now U.S. Pat. No. 3,320,879. The belt 47 may be formed of any relatively thick pile fabric material such as a mohair pile fabric. It may also be formed of a foamed elastomer material. The important criterion in selection of the fabric for the belt 47 is that the material must be capable of having a large number of cavities or interstices into which ink powder can be deposited and subsequently transferred to the electrostatic screen 41. Mounted in close proximity to the upper surface of the belt 47 is a charging roller 50, which engages the upper surface of the belt as it passes therebeneath. The surface speed of the charging roller 50 is different than the surface speed of the belt 47 and moreover, rotates in a different direction than the belt. This type of action creates a frictional effect, thereby causing a triboelectric charge on the ink particles retained in the interstices of the belt 47. The charging roller 50 also provides initial distribution of the ink transversely across the belt 47 so that a substantially even line of ink charge is delivered to the screen 41.

Again, the axis of rotation of the container 42 is such that the exterior wall thereof tangentially approaches and tangentially departs from the screen so that printing occurs along an elemental line of closest approach. The container is similarly rotated at approximately the same rate of speed as the oscillation or movement of the screen through this line of closest approach so that a continuing line of tangency occurs between the surface of the container and the surface of the screen. The ink particles which are retained on the belt 47 are deposited at the screen 41 along this line of closest approach or tangency. Therefore, simultaneously with the movement of the screen and rotation of the container electroscopic ink particles are moved toward and through the screen along the elemental line of closest approach to the container by means of the electrostatic field.

It should be understood in connection with the feeding mechanisms 12, 27 and 40 that each of these mechanisms could be used with curved screens such as the curved screen 10 in the apparatus B or the curved screen 11 in the apparatus C. In these latter cases, the containers are rotated in timed relation to the rotation or arcuate oscillation of the screen. Tangential approach and departure of the container with respect to the screen is still maintained even though a roller type of feed mechanism is not employed. It should also be understood that a shield having a slot in the area of the line of closest approach can be employed with any of the electrostatic printing apparatus A, B or C. Moreover, this type of shield can be employed with the apparatus which uses any of the ink feeding mechanisms 12, 27 or 40.

Figure 8:
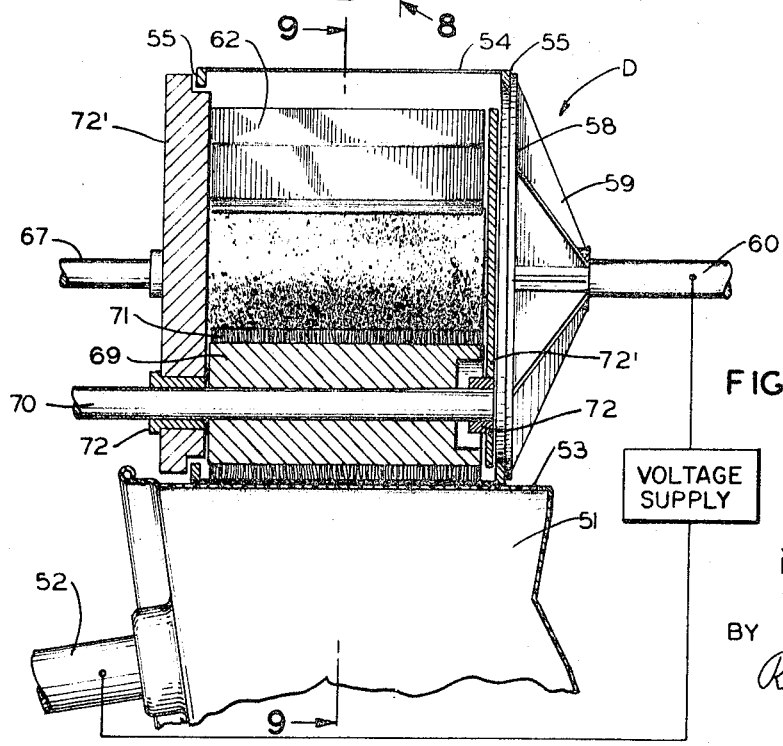
FIG. 8 is a vertical sectional view taken along line 8—8 of FIG. 7.
Figure 9:
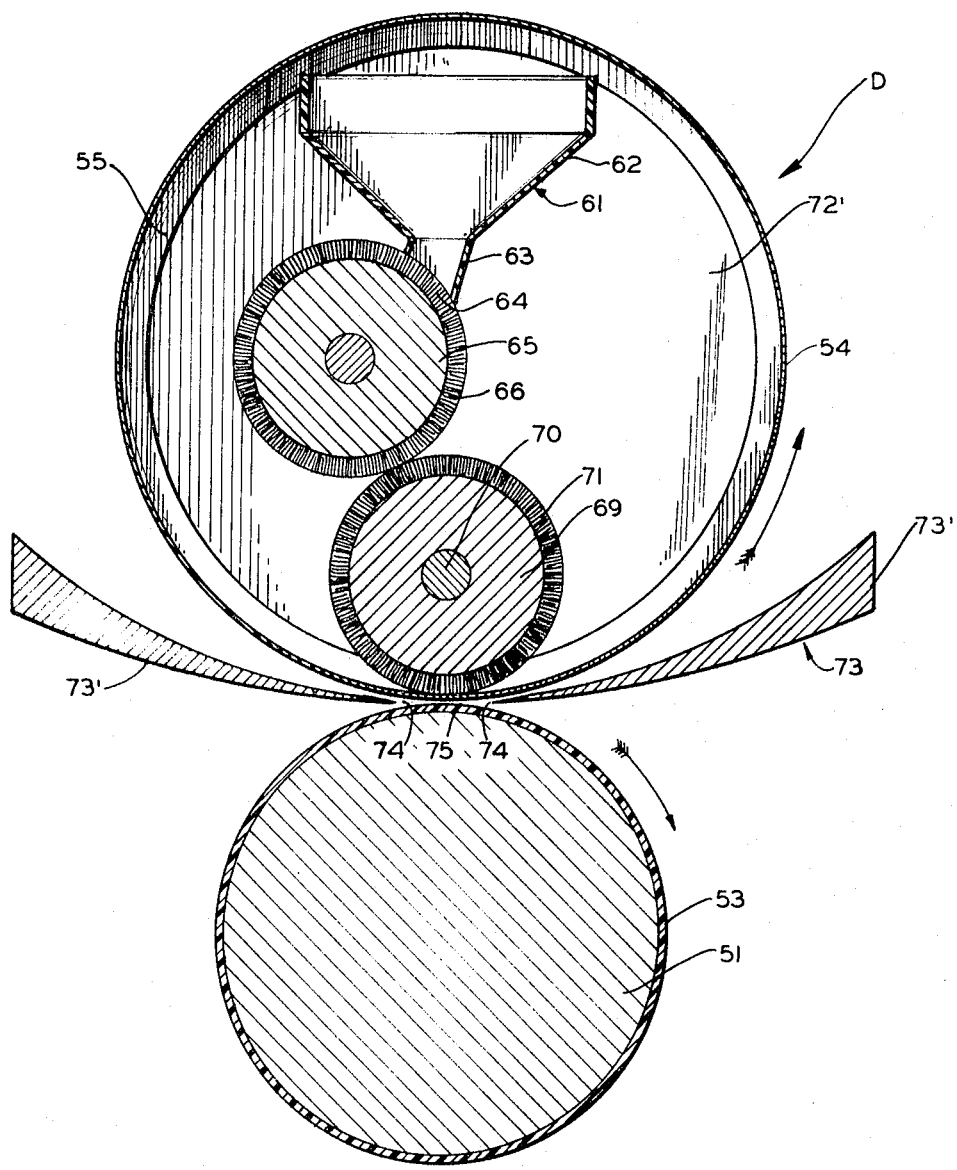
FIG. 9 is a vertical sectional view taken along line 9—9 of FIG. 8.

It is possible to provide a modified form of electrostatic printing apparatus D substantially as shown in FIGS. 7–9 and which is similar to the previously described electrostatic printing apparatus B. The electrostatic printing apparatus D generally comprises a mandrel or counter-electrode 51 operatively retained on a mandrel shaft 52 for supporting a cup or similar thin-walled container 53. The container 53 is generally of the nestable disposable type of container and is conically shaped. Moreover, it presents a relatively straight-lined conically shaped contour, at least in the area which is to receive the print.

The apparatus D also comprises a conically shaped electrostatic screen 54 which is retained in a pair of fairly rigid circular screen frames 55. The screen contains masked non-printing areas 56 and printing areas and non-masked printing areas which have suitable designs 57 to be imprinted on the container. The non-masked printing areas are the areas where the screen permits a flow of electroscopic ink therethrough. Whereas the screen 3 oscillated between two end positions and the arcuate screens 10 and 11 generally oscillated between two end positions, the screen 54 is designed to rotate in complete revolutions. However, it should be understood that the screen 54 can be oscillated, if desired.

One of the end frames is closed by a relatively heavy end plate 58 and secured thereto by means of a spider-type series of gussets 59 is a powered shaft 60. The shaft 60 is ultimately connected to any suitable source of mechanical power for rotating the same. This source of mechanical power does not, in and of itself, form part of the present invention, is conventional in its construction and is, therefore, neither illustrated nor described in detail herein. The conical screen 54 is open at its other end and internally disposed within the screen 54 is an ink feeding mechanism 61 which is substantially similar to the ink feeding mechanism used in the apparatus A. The ink feeding mechanism 61 generally comprises an ink hopper 62 which may be mounted on any suitable supporting structure (not shown) extending into the interior of the conical screen 54. The ink hopper 62 is again formed of any suitable synthetic resin or plastic material or any other material which is inert with respect to the ink employed in the hopper 62. The ink hopper 62 is provided with a longitudinally extending ink discharge neck 63 having a discharge slot 64. Disposed beneath the discharge neck 63 is a distributor roller 65 having a pile fabric surface 66. The fabric 66 should preferably be of a bristle-like fabric such as a mohair pile fabric, and may be secured to the annular surface of the distributor roller 65 by means of any suitable adhesive. The bristle brush construction provides a series of brushes which extend upwardly through the discharge slot 64 and engage ink particles as the distributor roller 65 rotates. The ink particles become deposited in the interstices of the fabric 66. The material selected for the construction of the fabric 66 is not critical and the only important criterion in the selection of the fabric is that the material must have a sufficient number of cavities or interstices into which ink powder can be deposited and subsequently transferred. Moreover, the fabric 66 must also have a different triboelectric charging potential than the ink which is selected for use in the printing operation. The distributor roller 65 is keyed or otherwise rigidly secured to a distributor roller support shaft 67. The shaft extends outwardly of the conical screen 54 and is journaled in any suitable bearing blocks (not shown) for supporting the same.

Disposed beneath the distributor roller 65 and in rolling contact therewith is an ink feeding roller 69, which is keyed or otherwise rigidly secured to a powered shaft 70. The shaft 70 is ultimately connected to a suitable prime mover (not shown) for rotating the feeding roller 69 at a desired rate of speed. The feeding roller 69 is also provided with a pile fabric material 71 on its outer surface which is substantially similar to the fabric 66 employed on the distributor roller 65. The fabric 71 on the feeding roller 69 is designed to pick up the ink particles contained within the interstices of the fabric 66 on the distributor roller 65. Moreover, the facewise contact of the distributor roller 65 and the feeding roller 69 provides a method of evenly distributing the charge of ink across the length of the fabric 71, for ultimate application to the screen 54. The shaft 70 is suitably journaled in a bearing 72, the latter being supported by a pair of bearing plates 72', all as can best be seen in FIGS. 7 and 8. By further reference to FIG. 7, it can be seen that the fabric surface 71 of the feeding roller 69 remains in facewise contact with the interior surface of the screen 54 in approximate vertical alignment with the mandrel shaft 52.

A suitable electrostatic field is created between the feeding roller 69, the screen 54 and the mandrel 51 by a suitable mechanism (not shown). This type of mechanism for creating the electrostatic field is conventional in its construction and is, therefore, neither illustrated nor described herein. It is pointed out, however, that the electrostatic field can be developed by a variable high potential source which is adapted to develop a relatively high direct current potential, thereby creating a very definite electron current or space current which flows across the printing space during the printing operation.

A shield 73 formed by a pair of wedge shaped members 73' is interposed between the screen 54 and the container 53. The wedge shaped members 73' are preferably formed of material having a relatively low dielectric constant such as plate glass and serve as printing gap defining members. The wedge shaped members 73' have opposed terminal margins 74 which provide a printing gap 75 which is approximately 0.1 to 0.5 inch wide and extends for the full length of the cylindrical screen 54. It can also be seen by reference to FIG. 9 that a definite and appreciably small space exists between the fabric surface 71 on the feeding roller 70 and the exterior surface of the container 53.

By further reference to FIGS. 7 and 8, it can also be seen that the mandrel supporting shaft 52 is not parallel in space to the axis of rotation of the screen which is defined by the screen supporting shaft 60. However, it can be seen that the mandrel supporting shaft 52 and the screen supporting shaft 60 lie within a single plane, that is a vertical plane as illustrated in FIGS. 7 and 8. By further reference to FIGS. 8 and 9, it can be seen that the screen 54 has a surface contour in at least one plane which is substantially identical to a portion of the surface contour of the conically shaped container 53. In the plane passing through the axis of rotation of the container 53 and screen 54, where the cylindrical screen tangentially approaches the side wall of the container 53, each of the surfaces are substantially parallel. A portion of the wall of the conically shaped container generates flat lines about its central axis. Similarly, the conical screen generates a series of flat lines lying equidistantly at a point from the central axis of the screen 54. These flat lines at the base of the screen and the upper margin of the container, are essentially parallel to each other. Therefore, it can be seen that by rotation of the screen 54 and of the mandrel 51 the exterior portion of the cup 53, which is to be printed, tangentially approaches and departs from the screen so that the printing will occur along an elemental line of closest approach. Again, the peripheral rates of speed of the screen 54 and of the container 53 are substantially the same for the screen 54 and the cup 53 through this line of closest approach so that a continuing line of tangency is maintained between the surface of the container and the surface of the screen.

The electroscopic ink from the feeding roller 69 is deposited onto the interior surface of the screen 54 and will pass through the non-masked printing areas 57, when the printing areas 57 pass beneath the roller 69. Therefore, as the rotation of the screen 54 brings the printing areas 57 beneath the roller 69, ink will pass through the electrostatic screen 54 and will be caught in the electrostatic field maintained between the mandrel 51 and the roller 69. As this occurs, the electroscopic ink particles are moved toward the container 53 along the elemental line of closest approach by means of the electrostatic field. Continued rotation of the screen 54 and of the container 53 will pass all portions of the printing areas 57 beneath the rollers 69. Continued supply of ink will pass through each of these portions of the area 57 and imprint the same on the container 53. The shield 73 may be optionally employed and marginally improves the printing result inasmuch as it prevents over-spraying or passage of ink through the opened areas 57 other than at the line of closest approach.

It has been found in connection with the present invention that by use of the tangential approach and departure of a moving substrate and a moving screen, it is possible to perform electrostatic contact printing with employment of an electrostatic screen. In each of the devices aforementioned, all of the electrostatic printing performed has involved the transfer of the electroscopic ink across a definite and appreciable space, that is the distance between the screen and the substrate. In the devices of the prior art, it was necessary for the substrate to be physically separated from the screen and feeding mechanism and this caused the electroscopic ink particles to move across a space and to the surface to be printed. The transference of the ink across a definite and appreciable space was necessary in the devices heretofore provided inasmuch as contact electrostatic printing would provide blurred images and considerable smearing before the ink was hardened or fixed. In connection with the present invention, therefore, it has been found that electrostatic printing can be performed with the transference of ink by bringing the substrate into very light contact with the screen and ink feeding mechanism. It should be understood that this contact is not sufficiently heavy to effect printing in the conventional manners such as by lithographic printing, which requires pressures and strengths. This type of pressure and strength, which is generally provided in lithographic printing would effectively destroy the image if employed in electrostatic printing. In other words, the contact preferred is very light contact with insufficient mechanical pressure to force the ink onto the substrate. The most desirable condition is to just have the substrate barely touch the screen so that at the instant of line printing, the line of closest approach will reside in contact with the screen and by means of the electrostatic field, will force the ink through the screen and onto the substrate.

Contact electrostatic printing can be effected in much the same manner as electrostatic printing which involves a transference of electroscopic ink particles across a definite and appreciable space. FIG. 10 illustrates an apparatus E for contact electrostatic printing and which employs a mandrel 77 which also serves as a counter-electrode and is designed to support a substrate in the form of a conically shaped container 76. The apparatus E also includes a flat screen 78, which is preferably retained in a fairly rigid screen frame (not shown). The screen 78 is substantially identical to the previously described screen 3 and contains masked non-printing areas and non-masked printing areas where the screen permits a flow of electroscopic ink therethrough. Moreover, the screen 78 oscillates and shifts for a distance which is a substantial fraction of the length of the screen 78 during each printing cycle. Mounted on the opposite side of the screen 78 with respect to the mandrel 77 is an ink feeding mechanism 79, substantially identical to the previously described ink feeding mechanism employed in the apparatus A. The ink feeding mechanism 79 includes a hopper 80, a distributor roller 81 and an ink feeding roller 82. These components are the same as the respective components in the feeding mechanism in the apparatus A and are, therefore, not described in detail herein.

By further reference to FIG. 10, it can be seen that the feeding roller 82 resides in light contact with the surface of the screen 78. Moreover, the side wall of the container 76 similarly resides in very light contact with the surface of the screen 78. The mandrel 77 is designed to rotate in timed relation to the shifting of the screen 78 so that each portion of the surface of the container 76 which is to be printed resides in contact with a different portion of a continually moving screen 78. Again in contact electrostatic printing, the screen has a surface contour in at least one plane which is substantially identical to a portion of the surface contour of the container. In the printing of conically shaped containers, a portion of the wall generates continuous flat lines about its central axis. The flat screen similarly generates a plurality of longitudinally aligned flat lines in a straight plane. The flat lines generated by the exterior surface of the conically shaped container are parallel in space to the flat lines generated by the screen in at least one plane. Therefore, it can be seen that the axis of rotation of a container is such that the exterior wall thereof which is to be printed tangentially approaches, lightly contacts and tangentially departs from the screen so that printing occurs along the elemental line of closest approach. Again, the container must be rotated at approximately the same rate of speed as the movement of the screen through this closest line of approach and light contact so that the continuing line of tangency occurs at the point of contact between the surface of the container and the surface of the screen. Simultaneously with the movement of the screen and the rotation of the container, electroscopic ink particles are delivered by the feeding roller 82 at the point of contact where they are passed through the screen 78 and directly onto the container 76. Inasmuch as the container 76 is continually moving, there is no chance for the particles which are deposited on the container 76 to become smeared by further movement of the screen 78.

It is also possible to provide another modified form of electrostatic contact printing apparatus F substantially as shown in FIG. 11 and which is substantially similar to the previously described electrostatic printing apparatus B. Moreover, the electrostatic printing apparatus F is substantially similar to the printing apparatus E except that a curved screen 83 is employed. Again, it can be seen by reference to FIG. 11 that the feeding roller 82 resides in light contact with the screen 83 and moreover, the substrate 76 similarly resides in light contact with the surface of the screen 83. In this case, however, the screen 83 and substrate 76 provide very light tangential contact along an elemental line of closest approach. It can further be seen that the container is rotated at approximately the same rate of speed as the rotation or oscillation of the screen 83 through this line of light contact so that a continuing line of tangency occurs between the surface of the container 76 and the surface of the screen 83. Consequently, tangential approach and departure is still maintained.

It is possible to provide an additional modified form of electrostatic contact printing apparatus G substantially as shown in FIG. 12 and which is substantially similar to the previously described apparatus C except that tangential contact is maintained between an electrostatic screen 84 and the container 76. In this case, the screen 84 has its axis of rotation or oscillation on the same side thereof as the axis of rotation of the container 76. On the other hand, the screen 83 in the apparatus F had the axis of rotation on the opposite side of the screen with respect to the axis or rotation of the container 76. However, the same process is involved in the operation of the apparatus G, where tangential approach, tangential contact and tangential departure are made between the screen 84 and the container 76 along the elemental line of closest approach. The container is rotated at approximately the same rate of speed as the rotation or oscillation of the screen through this line of light contact so that a continuing line of tangency occurs between the surface of the container 76 and the surface of the screen 84. Consequently simultaneously with the rotation or oscillation of the screen 84 and the rotation of the container 76, electroscopic ink particles are moved from the feeding roller 82 through the screen 84 and to the substrate 76 at the line of tangential contact, by means of the electrostatic field.

It is possible to provide another modified form of electrostatic contact printing apparatus H, substantially as shown in FIG. 13 and which is substantially similar to the previously described electrostatic printing apparatus D except that the ink is not moved across a definite and appreciable space. In the electrostatic printing apparatus H, a circular screen 85 is employed and the feeding mechanism 79 is mounted within the screen 85 so that the feeding roller 82 remains in tangential contact with the lower margin of the screen 85. Moreover, the screen 85 remains in very light tangential contact with the container 76 along the margin of the container 76. In the case of the electrostatic printing apparatus H, the axis of rotation of the container 76 lies within the same vertical plane as the axis of rotation of the screen 85. However, the axis of rotation of the container 76 is not parallel in space to the axis of rotation of the screen 85 in the same manner as the comparable axes of rotation in the electrostatic printing apparatus D. However, it can be seen that the axis of rotation of the container 76 is such that the exterior wall thereof which is to be printed tangentially approaches, maintains light tangential contact and tangentially departs from the screen 85 so that printing will occur along the elemental line of closest approach, which is the elemental line of tangential contact. The container 76 is rotated at approximately the same rate of speed as the rotation of the screen through this line of tangential contact so that a continuing line of tangency occurs between the surface of the container 76 and the surface of the screen 85. Simultaneously with the rotation of the screen 85 and the rotation of the container 76, electroscopic ink particles are moved through the screen 85 and to the container 76 along this elemental line of tangential contact, by means of the electrostatic field.

In each of the apparatus heretofore described, electrostatic printing has been performed on a conically shaped container. As previously indicated, by use of the present invention, it is possible to perform electrostatic screen process printing on articles having various curvilinear shapes. This holds true whether or not the ink traverses a definite and appreciable space or whether electrostatic contact printing is employed. It is necessary that the surface contour of the screen is at least substantially identical to the surface contour of the substrate to be printed in at least one plane.

From the above, it can be seen that electrostatic printing could be accomplished on curvilinear articles having regular shapes, such as cylindrical containers. Where a flat screen is employed, the screen will oscillate in a plane which is parallel in space to the axis of rotation of the container. Moreover, it will shift through an arc which is perpendicular in space to the axis of rotation of the mandrel and container. Through this type of positioning, tangential approach and departure between the screen and the container can be maintained so that printing can occur along a line of closest approach. Thus, it can be seen that printing on a regularly curved surface of a cylindrical container is a simple modification of printing on the conically shaped container. The difference in printing on the two types of containers resides in the fact that the axis of rotation of the cylindrical containers is parallel to the plane of oscillation of the flat screen, whereas the axis of rotation of the conically shaped containers is angularly disposed in space with respect to the plane of oscillation of the screen. It can also be seen that electrostatic contact printing can be maintained in a cylindrical article.

It should be obvious from the above that either the curved screen or the cylindrical screen could be used in electrostatic printing of cylindrically shaped articles. In this case, the axis of rotation of the cylindrically shaped container is parallel in space to the axis of rotation or oscillation of the curved screen.

Figure 14:
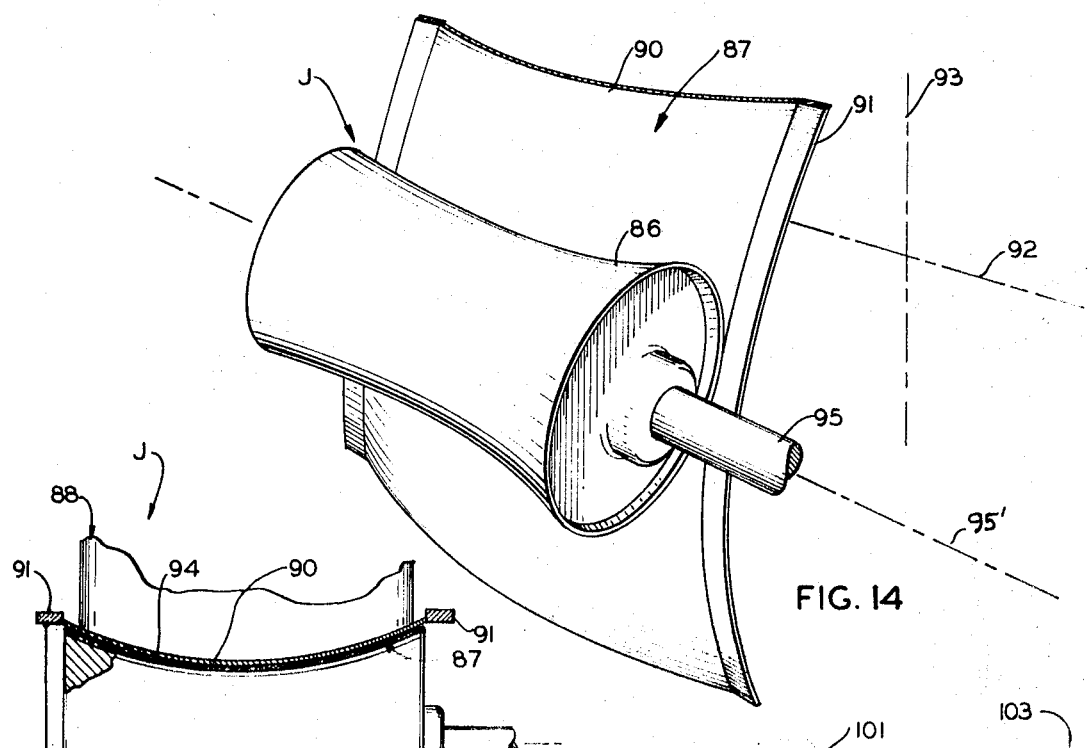
FIG. 14 is a perspective view, partially broken away and in section, of a modified form of electrostatic printing apparatus constructed in accordance with and embodying the present invention and showing the method of electrostatically printing on regular hyperbolically shaped articles.
Figure 15:
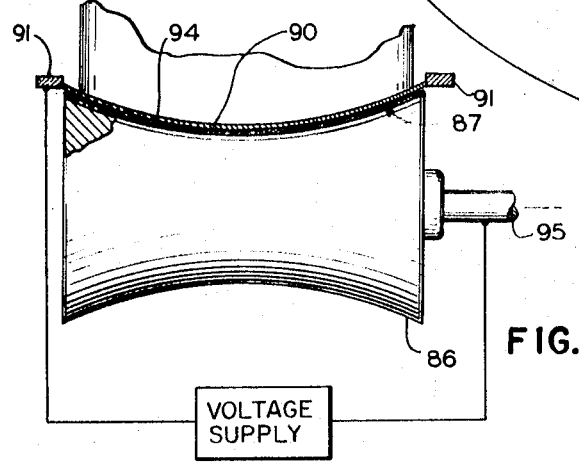
FIG. 15 is a top plan view, partially broken away, of the electrostatic printing apparatus of FIG. 14 and showing the relationship between the feeding mechanism, screen and article.

FIGS. 14 and 15 provide schematic illustrations of an electrostatic printing apparatus J which performs electrostatic printing on a hyperbolically shaped container 86. FIG. 14 provides a schematic perspective view showing the general shape of an electrostatic screen 87 used for printing on hyperbolically shaped articles, while FIG. 15 schematically discloses the relationship between the screen 87 and the container 86. FIG. 15 also discloses the schematic illustration of an ink feeding mechanism 88 which is employed therewith. While the apparatus J is illustrated as having a definite and appreciably small space between the screen 87 and the container 86, it should be understood that this type of apparatus could be modified to perform contact electrostatic printing as well. In this latter modification, the screen 87 would be in light tangential contact with the container 86.

The container 86 is described as a hyperboloid or hyperbolically shaped container inasmuch as the side walls 89 form a hyperbola, when presented in a front plan view. By reference to FIGS. 14 and 15, it can be seen that the hyperboloid is a regular hyperbola revolved about its central axis, thereby forming a surface of revolution about the central axis. The container 86 is symmetrical about its central axis and is also symmetrical about a radial axis equidistant from each transverse end. In other words, the circles of revolution generated about the central axis are substantially identical at equidistant points on opposite sides of the radial centerline. The screen 87 is formed with an arcuate portion 90, which has a surface contour substantially similar to the hyperbolically shaped wall 89 of the container 86. The arcuate portion 90 of the screen 87 is also connected on opposite transverse ends by two supporting arms 91, which are relatively flat with respect to the arcuate portion 90. By further reference to FIG. 14, it can be seen that the screen 87 is arcuately shaped and is designed to revolve or oscillate about an axis 92. Accordingly, it can be seen that the screen is arcuately shaped with respect to an axis of revolution 92, that is a substantially horizontal axis. However, the screen is relatively flat with respect to a vertical axis 93, reference being made to FIG. 14. It can be seen that the arcuate portion 90 is truly arcuate with respect to a vertical axis 93, whereas the supporting arms 91 are flat with respect to the vertical axis 93.

The feeding mechanism 88, which is employed in the apparatus J is substantially identical to the feeding apparatus 27, which uses an air delivery system. It has been found to be very suitable to employ air delivery systems with electrostatic screens of the type where they have arcuate surfaces generated by more than one axis of rotation, such as the screen 87. In this case, the apparatus 88 is provided with an arcuate feeding tip 94, which is substantially similar in shape, contour and size to the arcuate portion 90 of the screen 87, substantially as shown in FIG. 15. By further reference to FIG. 14, it can be seen that the container 86 can be rotated about a shaft 95, the axis of rotation 95' of which is parallel in space to the axis of rotation 92 of the screen 87.

Inasmuch as the container 86 does not have a continually tapering side wall and a relatively flat side wall revolved about a central axis, it is difficult to employ a mandrel such as the type of mandrel employed with the conically shaped container. Accordingly, a container supporting mechanism of the type described in U.S. Pat. No. 3,019,725, can be employed herein for supporting the container 86. This type of device is particularly desirable for supporting and manipulating in conjunction with a printing apparatus flexible walled containers having restricted or narrow neck openings or mouths. The container is interiorly supported on an expandable mandrel mechanism which is inserted through the neck opening and expanded therein by reciprocation of an actuating rod extending through the neck opening to position an elongated wall supporting element longitudinally of the container wall. The supporting apparatus for the container is generally mounted to be swingable, relative to the surface of the printing screen so that the container can be placed in printing position and can be engaged with the printing screen. This apparatus is neither illustrated nor described in detail herein since the mechanism for supporting the container 86 does not, in and of itself, constitute part of the present invention. However, it should be pointed out that this supporting apparatus also serves as a counter-electrode and serves to establish the electrostatic field between the screen and container. Therefore, the supporting apparatus is connected in any suitable manner to establish proper polarity in the electrostatic field.

By further reference to FIG. 14, it can be seen that the screen 87 has a surface contour in at least one plane which is substantially identical to at least one portion of the surface contour of the container 86. Thus, the screen 87 has a surface contour formed by the arcuate shape 90 and which is revolved about the vertical axis 93, whereas the container 86 has a side wall 89 revolved about a vertical axis similar to the axis 93. Moreover, the container 86 is rotated about its axis of rotation 95 which is parallel in space to the axis 93 for rotation of the screen 87. By this type of positioning, it can be seen that the axis of rotation of the container 86 is such that the exterior wall thereof to be printed, namely the wall 89, tangentially approaches and tangentially departs from the screen 87 so that printing occurs along an elemental line of closest approach. This elemental line of closest approach would be an arcuate line formed by that portion of the side wall 89 which approximates the closest approach to the arcuate portion 90 of the screen 87, substantially along a horizontal plane. Again, this line of closest approach would be substantially parallel in space to either the axis of rotation 95 or the axis of rotation 92. As in the previously described electrostatic printing apparatus, the container 86 is rotated at approximately the same rate of speed as the movement or rotation of the screen 87 through this line of closest approach so that a continuing line of tangency occurs between the surface of the container and the surface of the screen. Simultaneously with the movement of the screen 87 and the rotation of the container 86, electroscopic ink is provided by the ink feeding mechanism 88 and the particles are moved through the screen 87 along the elemental line of closest approach to the container 86 by means of the electrostatic field.

Figure 16:
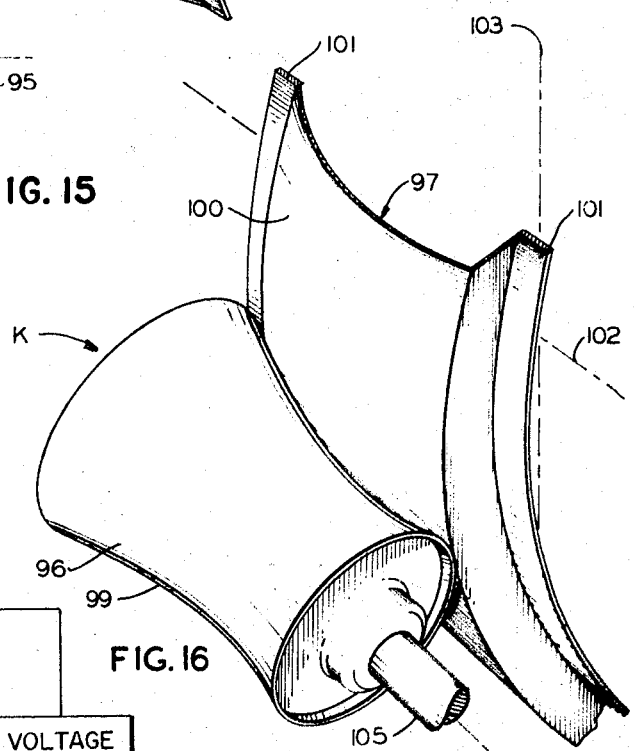
FIG. 16 is a perspective view, partially broken away and in section of another modified form of electrostatic printing apparatus constructed in accordance with and embodying the present invention and showing the method of electrostatically printing on irregular hyperbolically shaped articles.
Figure 17:
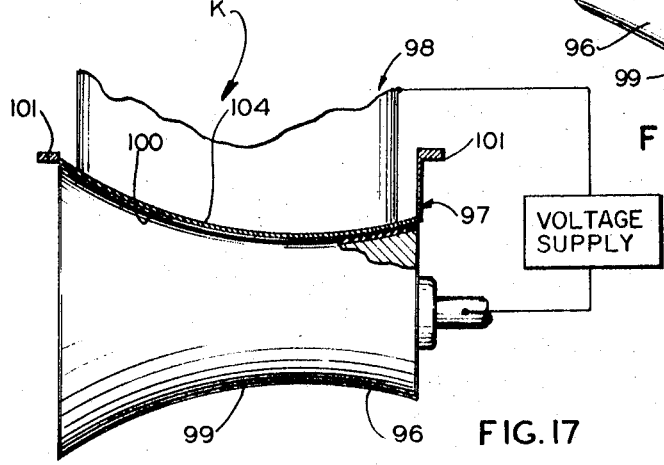
FIG. 17 is a top plan view, partially broken away and in section of the electrostatic printing apparatus of FIG. 16 and showing the relationship between the feeding mechanism, screen and article.

FIGS. 16 and 17 provide schematic illustrations of an electrostatic printing apparatus K which performs electrostatic printing on another type of hyperboloid or hyperbolically shaped container 96. FIG. 16 provides a schematic perspective view showing the general shape of an electrostatic screen 97 used for printing on irregular hyperbolically shaped articles, while FIG. 17 schematically discloses the relationship between the screen 97 and the container 96. FIG. 17 also discloses the schematic illustration of an ink feeding mechanism 98 which is employed therewith. While the apparatus A is illustrated as having a definite and appreciably small space between the screen 97 and the container 96, it should be understood that this type of apparatus could be modified to perform contact electrostatic printing as well. In this latter modification, the screen 97 would be in light tangential contact with the container 96.

Again, the container 96 is described as a hyperboloid or hyperbolically shaped container inasmuch as it has a side wall 99 which forms a hyperbola when presented in the front plan view. By further reference to FIGS. 16 and 17, it can be seen that the hyperboloid is an irregular hyperbola revolved about its central axis, thereby forming a surface or revolution about the central axis. It can be seen that the container 96 is symmetrical about its central axis, but is not symmetrical about a radial axis which is equidistant from each of the transverse ends of the container 96, the radial axis being perpendicular in space to the axial centerline. Thus, it can be seen that the circles of revolution generated about the central axis are not necessarily identical at equidistant points on the opposite sides of the radial centerline. Furthermore, one transverse end will be diametrally larger than the opposite transverse end of the container 96.

The screen 97 is formed with an arcuate portion 100, which has a surface contour substantially similar to the hyperbolically shaped side wall 99 of the container 96. The arcuate portion 100 of the screen 97 is also connected on opposite transverse ends by two supporting arms 101, which are relatively flat with respect to the arcuate portion 100. By further reference to FIG. 16, it can be seen that the screen 97 is arcuately shaped and is designed to revolve or oscillate about an axis 102. Accordingly, the screen is arcuately shaped with respect to an axis of revolution 92, that is a substantially horizontal axis. By further reference to FIG. 16, it can be seen that the arcuate portion 100 is arcuate with respect to a vertical axis 103. The feeding mechanism 98, which is employed in the apparatus K is substantially identical to the feeding apparatus 27 which uses an air delivery system. It has been found to be very suitable to employ air delivery systems for electroscopic ink with electrostatic screens of the type where they have arcuate surfaces generated by more than one axis or rotation such as the screen 97. In the case of the apparatus K, the screen is provided with an arcuate feeding tip 104 which is substantially similar in shape, contour and size to the arcuate portion 100 of the screen 97, substantially as shown in FIG. 17. By further reference to FIG. 16, it can be seen that the container 96 can be rotated about a shaft 105 which extends through the axial centerline of the container 96 and the axis of rotation 105' which is parallel in space to the axis of rotation 102 of the screen 97.

Inasmuch as the container 96 does not have a continually tapering side wall and a relatively flat side wall revolved about its central axis, it is difficult to employ a mandrel such as the type employed with conically shaped containers. Again, the container supporting mechanism of the type described in U.S. Pat. No. 3,019,725 can be employed for supporting the container 96. As in the case of the container 86, the container 96 is interiorly supported on an expandable mandrel mechanism which is inserted through the neck opening and expanded therein by reciprocation of an actuating rod extending through the neck opening to position an elongated wall supporting element longitudinally of the container wall. Furthermore, due to the supporting apparatus for the container 96, the container 96 is mounted in such manner so that it will be swingable relative to the surface of the printing screen so that the container can be placed in a printing position or can be engaged with the printing screen. Inasmuch as the apparatus does not constitute part of the present invention in and of itself, it is neither illustrated nor described in detail herein.

By further reference to FIG. 16, it can be seen that the screen 97 has a surface contour in at least one plane which is substantially identical to at least one portion of the surface contour of the container 96. The screen 97 has a surface contour formed by the arcuate portion 100 and which is revolved about the vertical axis 103, whereas the container 96 is formed by the side wall 99 being revolved about a vertical axis similar to the axis 103. However, the axis of rotation 105 of the container 96 is not parallel in space to the axis of rotation of the screen 97, except that the two axes of rotation 102,105' do lie within the same horizontal plane, reference being made to FIG. 16. However, it can be seen that the axis of rotation 105' of the container 96 is so positioned so that the side wall 99 tangentially approaches and tangentially departs from the arcuate surface 100 of the screen 97 so that printing will again occur along an elemental line of closest approach. In the case of the printing apparatus K, it can be seen that the elemental line of closest approach occurs in the same horizontal plane in which the axis of rotation 102,105' are disposed. This elemental line of closest approach would also be the arcuate line formed by that portion of the side wall 99, which approximates the closest approach to the arcuate portion 100 of the screen 97, substantially along this horizontal plane. The container 96 is rotated at approximately the same rate of speed as the movement or rotation of the screen 97 through this line of closest approach so that a continuing line of tangency occurs between the surface of the container 96 and the surface of the screen 97. Simultaneously with the movement of the screen 97 and the rotation of the container 96, electroscopic ink particles are introduced into an electrostatic field by the feeding mechanism 98 and the electroscopic ink particles are moved toward and through the screen 97 along the elemental line of closest approach to the container 96 by means of the electrostatic field.

FIGS. 18 and 19 are provided for illustration of the purely conventional mechanisms such as the voltage source creating the electrostatic field and for the motive means which drives the screen and mandrel in pretimed relationship. FIGS. 18 and 19 comprise apparatus which is substantially identical to the apparatus of FIGS. 1 and 7, respectively, except for the showing of the conventional motive means and conventional voltage source for creating an electrostatic field. It should be understood that these FIGS. 1 and 7 are merely illustrative and that the apparatus disclosed in FIGS. 2–6 and 10–17 are similarly provided with such conventional mechanisms and operate in like manner.

FIG. 18 is a schematic perspective view of an electrostatic printing apparatus L, substantially identical in all respects to the electrostatic printing apparatus A illustrated in FIG. 1. The electrostatic printing apparatus L in similar respect comprises a mandrel 106 which is secured to a shaft 107, the latter being driven by a suitable conventional motor 108. It should be understood that the motor 108 is a self-contained unit including conventional speed reducing mechanisms and proper gearing. The printing apparatus L also comprises an electrostatic printing screen or stencil 109, which is secured to a shaft 110. The shaft 110 is, in turn, driven by the motor 108 through a belt and pulley drive system 111. By reference to FIG. 18, it can be seen that the motor 108 is, in effect, directly connected both to the stencil 109 and the mandrel 106 and thereby oscillates the stencil 109 in timed relationship to the movement of the mandrel 106. FIG. 18, therefore, illustrates the driving and timing mechanism for the movement of the mandrel. Connected across the mandrel 106 and the stencil 109 is a direct current voltage source 111' for creating an electrostatic field therebetween.

FIG. 19 is a schematic perspective view of an electrostatic printing apparatus M which is substantially identical in all respects to the previously described electrostatic printing apparatus D as illustrated in FIGS. 7–9. The printing apparatus M generally comprises a mandrel 112 which is secured to a shaft 113. The printing apparatus M also includes a circular screen 114 which is substantially identical to the screen frame 55. By further reference to FIG. 19, it can be seen that the screen 114 is secured to a shaft 115, which is driven by a conventional motor 116 through a belt and pulley system 117. It should be understood that the motor 116 is a self-contained unit including conventional speed reducing mechanisms and proper gearing. In similar manner, the shaft 113 is driven by the motor 116 through a belt and pulley system 118. Thus, it can be seen that the screen 114 and the mandrel 112 are each rotated in timed relationship. Also connected across the mandrel 106 and the stencil 109 is a direct current voltage source 119 for creating an electrostatic field therebetween.

While the present invention has illustrated the method of electrostatically printing on articles having conically shaped and hyperbolically shaped surfaces, it should be obvious that articles having almost any type of curvilinear shape could be printed by means of the present invention. Thus, it is only necessary to provide a means for rotating the article about an axis and moving a screen in timed relation to the rotation of the article. The screen, of course, must have a surface contour in at least one plane which is substantially identical to at least a portion of the surface contour of the article to be printed. With this basic criteria, tangential approach and departure can be maintained between the article and the screen, and therefore, it is possible to print electrostatically on curvilinearly shaped articles. Moreover, as long as this type of tangential approach and departure is maintained along a continuing line of closest approach, contact electrostatic printing can also be employed.

It should be observed that the various apparatus described herein do not illustrate nor describe the means for creating the electrostatic field in each of the apparatus described herein. The mechanism for providing the electrostatic field between the screen, the mandrel for holding the substrate and the feeding mechanism is generally conventional in its construction, and is, therefore, not included as part of the present invention in and of itself.

It should be understood that changes and modifications may be made in the form, construction, arrangement and combination of parts presently described and pointed out without departing from the nature and principle of our invention.

Having thus described our invention, what we desire to claim and secure by Letters Patent is:

1. The method of electrostatically screen process printing articles which have a central axis and an annular surface of revolution about said central axis, with a screen which has a curvilinear surface and can be arcuately shifted about an axis of movement, said screen also being curved with respect to said axis; said method comprising establishing an electrostatic field between said screen and said article, establishing an axis of rotation of said article concentric with its central axis and in a position so that a line of closest approach to said screen is parallel to the curvilinear surface of said screen, rotating said article about its central axis so that the annular surface to receive the ink tangentially approaches, forms an instantaneous elemental line of closest approach and tangentially departs from the screen, arcuately shifting said screen about its axis of shifting movement in timed relation to the rotation of the a article so that the curvilinear surface of the screen passes through the elemental line of closest approach, and feeding a quantity of electroscopic ink to said screen in a substantially thin flat line only along the elemental line of closest approach where relative movement exists between the surface of the screen and the thin flat line, said thin flat line being substantially equal to the dimension of the screen which is transverse to the direction of movement of said screen and occupying a small dimensional area of the screen in the direction of movement of the screen, and where the ink is passed through opened areas and propelled by said electrostatic field, thereby causing printing to occur only along the elemental line of closest approach to the screen.

2. The method of electrostatically screen process printing articles which have a central axis and an annular surface of revolution about said central axis, with a screen which has a curvilinear surface that can be arcuately shifted about an axis of movement, said screen also being curved with respect to said axis; said method comprising establishing an electrostatic field between said screen and said article, establishing an axis of rotation of said article concentric with its central axis and in a position so that a line of closest approach to said screen is parallel to the curvilinear surface of said screen, rotating said article about its central axis so that the annular surface to receive the ink tangentially approaches, forms an instantaneous elemental line of closest approach and tangentially departs from the screen, establishing the axis of shifting movement of said screen along a line which is parallel to the surface of the article to receive the ink and in the same plane as the line of closest approach and axis of rotation of said article, arcuately shifting said screen about its axis of shifting movement in timed relation to the rotation of the article so that the curvilinear surface of the screen passes through the elemental line of closest approach, and feeding a quantity of electroscopic ink to said screen in a substantially thin flat line only along the elemental line of closest approach where relative movement exists between the surface of the screen and the thin flat line, said thin flat line being substantially equal to the dimension of the screen which is transverse to the direction of movement of said screen and occupying a small dimensional area of the screen in the direction of movement of the screen, and where the ink is passed through opened areas and propelled by said electrostatic field, thereby causing printing to occur only along the elemental line of closest approach to the screen.

3. The method of electrostatically screen process printing an article having a central axis and an annular surface of revolution about said central axis, with a screen having a complete surface of revolution and which can be arcuately rotated about an axis of rotation, said screen also having its surface of revolution about said axis; said method comprising establishing an electrostatic field between said screen and said article, establishing an axis of rotation of said article concentric with its central axis and in a position so that a line of closest approach to said screen is parallel to the annular surface of said screen, rotating said article about its central axis so that the annular surface to receive the ink tangentially approaches, forms an instantaneous elemental line of closest approach and tangentially departs from the screen, establishing the axis of rotation of said screen along a line which is parallel to the surface of the article to receive the ink and in the same plane as the line of closest approach and axis of rotation of said article, arcuately rotating said screen about its axis of rotation in timed relation to the rotation of the article so that the surface of revolution of the screen passes through the elemental line of closest approach, and feeding a quantity of electroscopic ink to said screen in a substantially thin flat line only along the elemental line of closest approach where relative movement exists between the surface of the screen and the thin flat line, said thin flat line being substantially equal to the dimension of the screen which is transverse to the direction of movement of said screen and occupying a small dimensional area of the screen in the direction of movement of the screen, and where the ink is passed through opened areas and propelled by said electrostatic field, thereby causing printing to occur only along the elemental line of closest approach to the screen.

4. The method of electrostatically screen process printing an article having a central axis and an annular surface of revolution about said central axis, with a screen having a complete surface of revolution and which can be arcuately rotated about an axis of rotation, said screen also having its surface of revolution about said axis of rotation; said method comprising establishing an electrostatic field between said screen and said article, establishing an axis of rotation of said article concentric with its central axis and in a position so that a line of closest approach to said screen is parallel to the annular surface of said screen, rotating said article about its central axis so that the annular surface to receive the ink tangentially approaches, forms an instantaneous elemental line of closest approach and tangentially departs from the screen, establishing the axis of rotation of said screen along a line which is parallel to the surface of the article to receive the ink and in the same plane as the line of closest approach and axis of rotation of said article, rotating said screen about its axis of rotation in timed relation to the rotation of the article so that the surface of revolution of the screen passes through the elemental line of closest approach, and feeding a quantity of electroscopic ink by a feeding roller disposed within the entire surface of revolution of said screen, maintaining the feeding roller in tangential contact with the interior of the surface of revolution of said screen for application of ink to said screen in a substantially thin flat line only along the elemental line of closest approach where relative movement exists between the surface of the screen and the thin flat line, said thin flat line being substantially equal to the dimension of the screen which is transverse to the direction of movement of said screen and occupying a small dimensional area of the screen in the direction of movement of the screen, and where the ink is passed through opened areas and propelled by said electrostatic field, thereby causing printing to occur only along the elemental line of closest approach to the screen.

5. The method of electrostatically screen process printing articles which have a central axis and an annular surface of revolution about said central axis, with a screen which has a curvilinear surface and can be arcuately shifted about an axis of movement, said screen also being curved with respect to said axis; said method comprising establishing an electrostatic field between said screen and said article, establishing an axis of rotation of said article concentric with its central axis and in a position so that a line of contact exists between the annular surface of said article and the curvilinear surface of said screen, rotating said article about its central axis so that the annular surface to receive the ink tangentially approaches, forms an elemental line of instantaneous tangential contact and tangentially departs from the screen, arcuately shifting said screen about its axis of shifting movement in timed relation to the rotation of the article and causing the curvilinear surface of the screen to pass through and maintain contact with said article at the line of instantaneous tangential contact, and feeding a quantity of electroscopic ink to said screen in a substantially thin flat line only along the elemental line of instantaneous tangential contact where relative movement exists between the surface of the screen and the thin flat line, said thin flat line being substantially equal to the dimension of the screen which is transverse to the direction of movement of said screen and occupying a small dimensional area of the screen in the direction of movement of the screen, and where the ink is passed through opened areas and propelled by said electrostatic field, thereby causing printing to occur only along the elemental line of instantaneous tangential contact with the screen.

6. The method of electrostatically screen process printing articles which have a central axis and an annular surface of revolution about said central axis, with a screen which has a curvilinear surface and can be arcuately shifted about an axis of movement, said screen also being curved with respect to said axis; said method comprising establishing an electrostatic field between said screen and said article, establishing an axis of rotation of said article concentric with its central axis and in a position so that a line of contact exists between the annular surface of said article and the curvilinear surface of said screen, rotating said article about its central axis so that the annular surface to receive the ink tangentially approaches, forms an elemental line of instantaneous tangential contact and tangentially departs from the screen, establishing the axis of shifting movement of said screen along a line which is parallel to the surface of the article to receive the ink and in the same plane as the line of instantaneous tangential contact and axis of rotation of said article, arcuately shifting said screen about its axis of shifting movement in timed relation to the rotation of the article and causing the curvilinear surface of the screen to pass through and maintain contact with said article at the line of instantaneous tangential contact, and feeding a quantity of electroscopic ink to said screen in a substantially thin flat line only along the elemental line of instantaneous tangential contact where relative movement exists between the surface of the screen and the thin flat line, said thin flat line being substantially equal to the dimension of the screen which is transverse to the direction of movement of said screen and occupying a small dimensional area of the screen in the direction of movement of the screen, and where the ink is passed through opened areas and propelled by said electrostatic field, thereby causing printing to occur only along the elemental line of instantaneous tangential contact to the screen.

7. The method of electrostatically screen process printing an article having a central axis and an annular surface of revolution about said central axis, with a screen having a complete surface of revolution and which can be arcuately rotated about an axis of rotation, said screen also having its surface of revolution about said axis; said method comprising establishing an electrostatic field between said screen and said article, establishing an axis of rotation of said article concentric with its central axis and in a position so that a line of contact exists between the annular surface of said article and to the annular surface of said screen, rotating said article about its central axis so that the annular surface to receive the ink tangentially approaches, forms an elemental line of instantaneous tangential contact and tangentially departs from the screen, establishing the axis of rotation of said screen along a line which is parallel to the surface of the article to receive the ink and in the same plane as the line of instantaneous tangential contact and axis of rotation of said article, arcuately rotating said screen about its axis of rotation in timed relation to the rotation of the article and causing the surface of revolution of the screen to pass through and maintain contact with said article at the line of instantaneous tangential contact, and feeding a quantity of electroscopic ink to said screen in a substantially thin flat line only along the elemental line of instantaneous tangential contact where relative movement exists between the surface of the screen and the thin flat line, said thin flat line being substantially equal to the dimension of the screen which is transverse to the direction of movement of said screen and occupying a small dimensional area of the screen in the direction of movement of the screen, and where the ink is passed through opened areas and propelled by said electrostatic field, thereby causing printing to occur only along the elemental line of instantaneous tangential contact with the screen.

8. The method of electrostatically screen process printing an article having a central axis and an annular surface of revolution about said central axis, with a screen having a complete surface of revolution and which can be arcuately rotated about an axis of rotation, said screen also having its surface of revolution about said axis; said method comprising establishing an electrostatic field between said screen and said article, establishing an axis of rotation of said article concentric with its central axis and in a position so that a line of contact exists between the annular surface of said article and to the annular surface of said screen, rotating said article about its central axis so that the annular surface to receive the ink tangentially approaches, forms an elemental line of instantaneous tangential contact and tangentially departs from the screen, establishing the axis of rotation of said screen along a line which is parallel to the surface of the article to receive the ink and in the same plane as the line of instantaneous tangential contact and axis of rotation of said article, rotating said screen about its axis of rotation in timed relation to the rotation of the article and causing the surface of revolution of the screen to pass through and maintain contact with said article at the line of instantaneous tangential contact, and feeding a quantity of electroscopic ink by a feeding roller disposed within the entire surface of revolution of said screen, maintaining the feeding roller in tangential contact with the interior of the surface of revolution of said screen for application of ink to said screen in a substantially thin flat line only along the elemental line of instantaneous tangential contact where relative movement exists between the surface of the screen and the thin flat line, said thin flat line being substantially equal to the dimension of the screen which is transverse to the direction of movement of said screen and occupying a small dimensional area of the screen in the direction of movement of the screen, and where the ink is passed through opened areas and propelled by said electrostatic field, thereby causing printing to occur only along the elemental line of instantaneous tangential contact with the screen.

9. The method of electrostatically screen process printing articles which have a central axis and an annular surface of revolution which is hyperbolic about said central axis, with a screen which can be shifted with respect to the annular surface of said article wherein the screen has an arcuate face to match the hyperbolic surface of revolution of said article; said method comprising establishing an electrostatic field between said screen and said article, establishing an axis of rotation of said article concentric with its central axis, rotating said article about its central axis so that the annular surface to receive the ink tangentially approaches, forms an instantaneous elemental line of closest approach and tangentially departs from the screen, shifting said screen in timed relation to the rotation of the article and causing the screen to move in a tangential plane which lies in the line of closest approach, maintaining all points on the screen at the elemental line of closest approach equidistant from all opposed points on the article at the elemental line of closest approach, and feeding a quantity of electroscopic ink to said screen in substantially a thin flat line only along the elemental line of closest approach where relative movement exists between the surface of the screen and the thin flat line, said thin flat line being substantially equal to the dimension of the screen which is transverse to the direction of movement of said screen and occupying a small dimensional area of the screen in the direction of movement of the screen, and where the ink is passed through opened areas of said screen and propelled by said electrostatic field thereby causing printing to occur only along the elemental line of closest approach to the screen.

10. The method of electrostatically screen process printing articles which have a central axis and an annular surface of revolution which is hyperbolic about said central axis, with a screen which can be arcuately shifted about an axis of movement, said screen also being curved with respect to said axis wherein the screen has an arcuate face to match the hyperbolic surface of revolution of said article; said method comprising establishing an electrostatic field between said screen and said article, establishing an axis of rotation of said article concentric with its central axis, rotating said article about its central axis so that the annular surface to receive the ink tangentially approaches, forms an instantaneous elemental line of closest approach and tangentially departs from the screen, arcuately shifting said screen about its axis of shifting movement in timed relation to the rotation of the article so that the curvilinear surface of the screen passes through the elemental line of closest approach, maintaining all points on the screen at the elemental line of closest approach equidistant from all opposed points on the article at the elemental line of closest approach, and feeding a quantity of electroscopic ink to said screen in a substantially thin flat line only along the elemental line of closest approach where relative movement exists between the surface of the screen and the thin flat line, said thin flat line being substantially equal to the dimension of the screen which is transverse to the direction of movement of said screen and occupying a small dimensional area of the screen in the direction of movement of the screen, and where the ink is passed through opened areas and propelled by said electrostatic field, thereby causing printing to occur only along the elemental line of closest approach to the screen.

11. The method of electrostatically screen process printing an article having a central axis and an annular surface of revolution which is hyperbolic about said central axis, which can be arcuately rotated about an axis of rotation, said screen also having its surface of revolution about said axis with an arcuate face to match the hyperbolic surface of revolution of said article; said method comprising establishing an electrostatic field between said screen and said article, establishing an axis of rotation of said article concentric with its central axis, rotating said article about its central axis so that the annular surface to receive the ink tangentially approaches, forms an instantaneous elemental line of closest approach and tangentially departs from the screen, establishing the axis of rotation of said screen along a line which is parallel to the surface of the article to receive the ink and in the same plane as the line of closest approach and axis of rotation of said article, arcuately rotating said screen about its axis of rotation in timed relation to the rotation of the article so that the surface of revolution of the screen passes through the elemental line of closest approach, maintaining all points on the screen at the elemental line of closest approach equidistant from all opposed points on the article at the elemental line of closest approach, and feeding a quantity of electroscopic ink to said screen in a substantially thin flat line only along the elemental line of closest approach where relative movement exists between the surface of the screen and the thin flat line, said thin flat line being substantially equal to the dimension of the screen which is transverse to the direction of movement of said screen and occupying a small dimensional area of the screen in the direction of movement of the screen, and where the ink is passed through opened areas and propelled by said electrostatic field, thereby causing printing to occur only along the elemental line of closest approach to the screen.

12. The method of electrostatically screen process printing articles which have a central axis and an annular surface of revolution which is hyperbolic about said central axis, with a screen which can be shifted with respect to the annular surface of said article wherein the screen has an arcuate face to match the hyperbolic surface of revolution of said article; said method comprising establishing an electrostatic field between said screen and said article, establishing an axis of rotation of said article concentric with its central axis and in a position so that a line of contact exists between the annular surface of said article and the arcuate face of said screen, rotating said article about its central axis so that the annular surface to receive the ink tangentially approaches, forms an elemental line of instantaneous tangential contact and tangentially departs from the screen, shifting said screen in timed relation to the rotation of the article and causing the screen to pass through and maintain contact with said article at the line of instantaneous tangential contact, maintaining all points on the screen at the elemental line of contact in direct contact with all opposed points on the article at the elemental line of contact, and feeding a quantity of electroscopic ink to said screen in substantially a thin flat line only along the elemental line of instantaneous tangential contact where relative movement exists between the surface of the screen and the thin flat line, said thin flat line being substantially equal to the dimension of the screen which is transverse to the direction of movement of said screen and occupying a small dimensional area of the screen in the direction of movement of the screen, and where the ink is passed through opened areas of said screen and propelled by said electrostatic field thereby causing printing to occur only along the elemental line of instantaneous tangential contact with the screen.

13. The method of electrostatically screen process printing articles which have a central axis and an annular surface of revolution which is hyperbolic about said central axis, with a curvilinear screen which can be arcuately shifted about an axis of movement, said screen also being curved with respect to said axis wherein the screen has an arcuate face to match the hyperbolic surface of revolution of said article; said method comprising establishing an electrostatic field between said screen and said article, establishing an axis of rotation of said article concentric with its central axis, in a position so that a line of contact exists between the annular surface of said article and the curvilinear surface of said screen, rotating said article about its central axis so that the annular surface to receive the ink tangentially approaches, forms an elemental line of instantaneous tangential contact and tangentially departs from the screen, arcuately shifting said screen about its axis of shifting movement in timed relation to the rotation of the article and causing the curvilinear surface of the screen to pass through and maintain contact with said article at the line of instantaneous tangential contact, maintaining all points on the screen at the elemental line of contact in direct contact with all opposed points on the article at the elemental line of contact, and feeding a quantity of electroscopic ink to said screen in a substantially thin flat line only along the elemental line of instantaneous tangential contact where relative movement exists between the surface of the screen and the thin flat line, said thin flat line being substantially equal to the dimension of the screen which is transverse to the direction of movement of said screen and occupying a small dimensional area of the screen in the direction of movement of the screen, and where the ink is passed through opened areas and propelled by said electrostatic field, thereby causing printing to occur only along the elemental line of instantaneous tangential contact with the screen.

14. The method of electrostatically screen process printing an article having a central axis and an annular surface of revolution which is hyperbolic about said central axis, with a screen which can be arcuately rotated about an axis of rotation, said screen also having a surface of revolution about said axis with an arcuate face to match the hyperbolic surface of revolution of said article; said method comprising establishing an electrostatic field between said screen and said article, establishing an axis of rotation of said article concentric with its central axis, in a position so that a line of contact exists between the annular surface of said article and to the annular surface of said screen, rotating said article about its central axis so that the annular surface to receive the ink tangentially approaches, forms an elemental line of instantaneous tangential contact and tangentially departs from the screen, establishing the axis of rotation of said screen along a line which is parallel to the surface of the article to receive the ink and in the same plane as the line of instantaneous tangential contact and axis of rotation of said article, arcuately rotating said screen about its axis of rotation in timed relation to the rotation of the article and causing the surface of revolution of the screen to pass through and maintain contact with said article at the line of instantaneous tangential contact, maintaining all points on the screen at the elemental line of closest approach equidistant from all opposed points on the article at the elemental line of closest approach, and feeding a quantity of electroscopic ink to said screen in a substantially thin flat line only along the elemental line of instantaneous tangential contact where relative movement exists between the surface of the screen and the thin flat line, said thin flat line being substantially equal to the dimension of the screen which is transverse to the direction of movement of said screen and occupying a small dimensional area of the screen in the direction of movement of the screen, and where the ink is passed through opened areas and propelled by said electrostatic field, thereby causing printing to occur only along the elemental line of instantaneous tangential contact with the screen.

15. An apparatus for electrostatically printing articles which have a central axis and an annular surface of revolution about said axis; said apparatus comprising support means for supporting said article and being rotatable about an axis, a curvilinear screen mounted in relation to said article and being shiftable through an arc about an axis, said screen having a surface which is curvilinear about said last-named axis, means for creating an electrostatic field between said screen and said article, said support means having its axis of rotation established so that a line of closest approach to said screen is parallel to the curvilinear surface of said screen, means for rotating said article about its axis of rotation so that the surface to receive the ink tangentially approaches, forms an instantaneous elemental line of closest approach and tangentially departs from the screen, means for arcuately shifting said screen about its axis of arcuate shiftable movement in timed relation to the rotation of said article so that the curvilinear surface of the screen passes through the elemental line of closest approach, and means operatively associated with said screen for feeding a selected quantity of electroscopic ink to said screen in a substantially thin flat line only along the elemental line of closest approach, where relative movement exists between the surface of the screen and the thin flat line, said thin flat line being substantially equal to the dimension of the screen which is transverse to the direction of movement of said screen and occupying a small dimensional area of the screen in the direction of movement of the screen, and where the ink is passed through the screen only at the line of elemental closest approach and propelled toward said article by the electrostatic field, thereby causing printing to occur only along the elemental line of closest approach to the screen.

16. The apparatus of claim 15 wherein said container has a conical surface of revolution about the center line.

17. An apparatus for electrostatically printing articles which have a central axis and an annular surface of revolution about said axis; said apparatus comprising support means for supporting said article and being rotatable about an axis, a screen having an annular surface of revolution mounted in relation to said article and being rotatable about an axis, the axis of rotation of said screen being coincident with the central axis of the surface of revolution of said screen, means for creating an electrostatic field between said screen and said article, said support means having its axis of rotation established so that a line of closest approach to said screen is parallel to the annular surface of said screen, means for rotating said article about its axis of rotation so that the surface to receive the ink tangentially approaches, forms an instantaneous elemental line of closest approach and tangentially departs from the screen, means for rotating said screen about its axis of rotation in timed relation to the rotation of said article so that the annular surface of the screen instantaneously passes through the elemental line of closest approach, and means operatively associated with said screen for feeding a selected quantity of electroscopic ink to said screen in a substantially thin flat line only along the elemental line of closest approach, where relative movement exists between the surface of the screen and the thin flat line, said thin flat line being substantially equal to the dimension of the screen which is transverse to the direction of movement of said screen and occupying a small dimensional area of the screen in the direction of movement of the screen, and where the ink is passed through the screen only at the line of elemental closest approach and propelled toward said article by the electrostatic field, thereby causing printing to occur only along the elemental line of closest approach to the screen.

18. The apparatus of claim 17 wherein said container has a conical surface of revolution about the center line.

19. An apparatus for electrostatically printing articles which have a central axis and an annular surface of revolution about said axis; said apparatus comprising support means for supporting said article and being rotatable about an axis, a screen having an annular surface of revolution mounted in relation to said article and being rotatable about an axis, the axis of rotation of said screen being coincident with the central axis of the surface of revolution of said screen, means for creating an electrostatic field between said screen and said article, said support means having its axis of rotation established so that a line of closest approach to said screen is parallel to the annular surface of said screen, means for rotating said article about its axis of rotation so that the surface to receive the ink tangentially approaches, forms an instantaneous elemental line of closest approach and tangentially departs from the screen, means for rotating said screen about its axis of rotation in timed relation to the rotation of said article so that the annular surface of the screen instantaneously passes through the elemental line of closest approach, and means disposed within the annular surface of revolution of said screen for feeding a selected quantity of electroscopic ink to said screen, said last-named means including a feeding roller in rolling tangential contact with the interior surface of revolution of said screen for delivering the ink in a substantially thin flat line only along the elemental line of closest approach, where relative movement exists between the surface of the screen and the thin flat line, said thin flat line being substantially equal to the dimension of the screen which is transverse to the direction of movement of said screen and occupying a small dimensional area of the screen in the direction of movement of the screen and where the ink is passed through the screen only at the line of elemental closest approach and propelled toward said article by the electrostatic field, thereby causing printing to occur only along the elemental line of closest approach to the screen.

20. An apparatus for electrostatically printing articles which have a central axis and an annular surface of revolution about said axis; said apparatus comprising support means for supporting said article and rotatable about an axis, a curvilinear screen mounted in relation to said article and being shiftable through an arc about an axis, said screen having a surface which is curvilinear about said last-named axis, means for creating an electrostatic field between said screen and said article, said support means having its axis of rotation established so that a line of closest approach to said screen is parallel to the curvilinear surface of said screen, means for rotating said article about its axis of rotation so that the surface to receive the ink tangentially approaches, forms an instantaneous elemental line of closest approach and tangentially departs from the screen, means for arcuately shifting said screen about its axis of arcuate shiftable movement in timed relation to the rotation of said article so that the curvilinear surface of the screen passes through the elemental line of closest approach, and means operatively associated with said screen for feeding a selected quantity of electroscopic ink to said screen in a substantially thin flat line only along the elemental line of closest approach, where relative movement exists between the surface of the screen and the thin flat line, said thin flat line being substantially equal to the dimension of the screen which is transverse to the direction of movement of said screen and occupying a small dimensional area of the screen in the direction of movement of the screen, and where the ink is passed through the screen only at the line of elemental closest approach and propelled toward said article by the electrostatic field, thereby causing printing to occur only along the elemental line of closest approach to the screen.

21. The apparatus of claim 20 wherein said container has a conical surface of revolution about the center line.

22. An apparatus for electrostatically printing on articles which have a central axis and an annular surface of revolution about said axis; said apparatus comprising support means for supporting said article and being rotatable about an axis, a screen having an annular surface of revolution mounted in relation to said article and being rotatable about an axis, the axis of rotation of said screen being coincident with the central axis of the surface of revolution of said screen, means for creating an electrostatic field between said screen and said article, said support means having its axis of rotation established so that a line of contact exists between the annular surface of said screen and the annular surface of said article, means for rotating said article about its axis of rotation so that the surface to receive the ink tangentially approaches, forms an elemental line of instantaneous tangential contact and tangentially departs from the screen, means for rotating said screen about its axis of rotation in timed relation to the rotation of said article so that the annular surface of the screen passes through the elemental line of contact and maintains instantaneous contact with the article thereat, and means operatively associated with said screen for feeding a selected quantity of electroscopic ink to said screen in a substantially thin flat line only along the line of instantaneous contact where relative movement exists between the surface of the screen and the thin flat line, said thin flat line being substantially equal to the dimension of the screen which is transverse to the direction of movement of said screen and occupying a small dimensional area of the screen in the direction of movement of the screen, and where the ink is passed through the screen only at the line of tangential contact and propelled toward said article by the electrostatic field, thereby causing printing to occur only along the elemental line of instantaneous tangential contact.

23. The apparatus of claim 22 wherein said container has a conical surface of revolution about the center line.

24. An apparatus for electrostatically printing on articles which have a central axis and an annular surface of revolution about said axis; said apparatus comprising support means for supporting said article and being rotatable about an axis, a screen having an annular surface of revolution mounted in relation to said article and being rotatable about an axis, the axis of rotation of said screen being coincident with the central axis of the surface of revolution of said screen, means for creating an electrostatic field between said screen and said article, said support means having its axis of rotation established so that a line of contact exists between the annular surface of said screen and the annular surface of said article, means for rotating said article about its axis of rotation so that the surface to receive the ink tangentially approaches, forms an elemental line of instantaneous tangential contact and tangentially departs from the screen, means for rotating said screen about its axis of rotation in timed relation to the rotation of said article so that the annular surface of the screen passes through the elemental line of contact and maintains instantaneous contact with the article thereat, and means disposed within the annular surface of revolution of said screen for feeding a selected quantity of electroscopic ink to said screen, said last-named means including a feeding roller in rolling tangential contact with the interior of the surface of revolution of said screen for delivering the ink in a substantially thin flat line only along the line of instantaneous contact where relative movement exists between the surface of the screen and the thin flat line, said thin flat line being substantially equal to the dimension of the screen which is transverse to the direction of movement of said screen and occupying a small dimensional area of the screen in the direction of movement of the screen, and where the ink is passed through the screen only at the line of tangential contact and propelled toward said article by the electrostatic field, thereby causing printing to occur only along the elemental line of instantaneous tangential contact.

25. An apparatus for electrostatically printing on curvilinear articles, said apparatus comprising base means, means for supporting said article on said base means and being arcuately shiftable about an axis, a screen mounted in relation to said article and being shiftable with respect thereto, means for creating an electrostatic field between said screen and said article, means operatively mounted on said base means for feeding a selected quantity of electroscopic ink to said screen where the ink is passed through the screen and propelled toward said article by the electrostatic field, means for arcuately shifting said article so that the surface to receive the ink tangentially approaches, forms an elemental line of closest approach and tangentially departs from the screen, a shield stationarily mounted on said base means and having a narrow slit forming a printing gap interposed between said screen and article, said slit being positioned at the elemental line of closest approach and being sufficiently wide to permit passage of ink along the line of closest approach and sufficiently small to prevent overspray of ink and uneven ink deposition, and means for shifting said screen in timed relation to the shifting movement of the article, thereby causing printing to occur only along the elemental line closest approach to the screen.

26. An apparatus for electrostatically printing on curvilinear articles, said apparatus comprising base means, means for supporting said article on said base means and being arcuately shiftable about an axis, a screen mounted in relation to said article and being shiftable with respect thereto, means for creating an electrostatic field between said screen and said article, means operatively mounted on said base means for feeding a selected quantity of electroscopic ink to said screen where the ink is passed through the screen and propelled toward said article by the electrostatic field, means for arcuately shifting said article so that the surface to receive the ink tangentially approaches, forms an elemental line of instantaneous tangential contact and tangentially departs from the screen, a shield stationarily mounted on said base means and having a narrow slit forming a printing gap interposed between said screen and article, said slit being positioned at the elemental line of contact and being sufficiently wide to permit passage of ink along the line of contact and sufficiently small to prevent overspray of ink and uneven ink deposition, and means for shifting said screen in timed relation to the shifting movement of the article, thereby causing printing to occur only along the elemental line of contact with the screen.

27. An apparatus for electrostatically printing articles which have a central axis and an annular surface of revolution about said axis; said apparatus comprising base means, support means operatively mounted on said base means for supporting said article and being rotatable about an axis, a screen having a substantially flat printing surface mounted in relation to said article and being shiftable in a plane, means for creating an electrostatic field between said screen and said article, said support means having its axis of rotation established so that a line of closest approach to said screen is parallel to the flat printing surface of said screen, means for rotating said article about its axis of rotation so that the surface to receive the ink tangentially approaches, forms an instantaneous elemental line of closest approach and tangentially departs from the screen, means for shifting said screen in a tangential plane which passes through the elemental line of closest approach and in timed relation to the rotation of said article, a shield stationarily mounted on said base means and having a narrow slit forming a printing gap interposed between said screen and article, said slit being positioned at the elemental line of closest approach and being sufficiently wide to permit passage of ink only along the line of closest approach and sufficiently small to prevent overspray of ink and uneven ink deposition, and means operatively associated with said screen for feeding a selected quantity of electroscopic ink to said screen in a substantially thin flat line only along the elemental line of closest approach, where relative movement exists between the surface of the screen and the thin flat line, said thin flat line being substantially equal to the dimension of the screen which is transverse to the direction of movement of said screen and occupying a small dimensional area of the screen in the direction of movement of the screen, and where the ink is passed through the screen only at the line of elemental closest approach and propelled toward said article by the electrostatic field, thereby causing printing to occur only along the elemental line of closest approach to the screen.

28. An apparatus for electrostatically printing articles which have a central axis and an annular surface of revolution about said axis; said apparatus comprising base means, support means operatively mounted on said base means for supporting said article and being rotatable about an axis, a curvilinear screen mounted in relation to said article and being shiftable through an arc about an axis, said screen having a surface which is curvilinear about said last-named axis, means for creating an electrostatic field between said screen and said article, said support means having its axis of rotation established so that a line of closest approach to said screen is parallel to the curvilinear surface of said screen, means for rotating said article about its axis of rotation so that the surface to receive the ink tangentially approaches, forms an instantaneous elemental line of closest approach and tangentially departs from the screen, means for arcuately shifting said screen about its axis of arcuate shiftable movement in timed relation to the rotation of said article so that the curvilinear surface of the screen passes through the elemental line of closest approach, a shield stationarily mounted on said base means and having a narrow slit forming a printing gap interposed between said screen and article, said slit being positioned at the elemental line of closest approach and being sufficiently wide to permit passage of ink only along the line of closest approach and sufficiently small to prevent overspray of ink and uneven ink deposition, and means operatively associated with said screen for feeding a selected quantity of electroscopic ink to said screen in a substantially thin flat line only along the elemental line of closest approach, where relative movement exists between the surface of the screen and the thin flat line, said thin flat line being substantially equal to the dimension of the screen which is transverse to the direction of movement of said screen and occupying a small dimensional area of the screen in the direction of movement of the screen and where the ink is passed through the screen only at the line of elemental closest approach and propelled toward said article by the electrostatic field, thereby causing printing to occur only along the elemental line of closest approach to the screen.

29. An apparatus for electrostatically printing articles which have a central axis and an annular surface of revolution about said axis; said apparatus comprising base means, support means operatively mounted on said base means for supporting said article and being rotatable about an axis, a screen having an annular surface of revolution mounted in relation to said article and being rotatable about an axis, the axis of rotation of said screen being coincident with the central axis of the surface of revolution of said screen, means for creating an electrostatic field between said screen and said article, said support means having its axis of rotation established so that a line of closest approach to said screen is parallel to the annular surface of said screen, means for rotating said article about its axis of rotation so that the surface to receive the ink tangentially approaches, forms an instantaneous elemental line of closest approach and tangentially departs from the screen, means for rotating said screen about its axis of rotation in timed relation to the rotation of said article so that the annular surface of the screen instantaneously passes through the elemental line of closest approach, a shield stationarily mounted on said base means and having a narrow slit forming a printing gap interposed between said screen and article, said slit being positioned at the elemental line of closest approach and being sufficiently wide to permit passage of ink only along the line of closest approach and sufficiently small to prevent overspray of ink and uneven ink deposition, and means operatively associated with said screen for feeding a selected quantity of electroscopic ink to said screen in a substantially thin flat line only along the elemental line of closest approach, where relative movement exists between the surface of the screen and the thin flat line, said thin flat line being substantially equal to the dimension of the screen which is transverse to the direction of movement of said screen and occupying a small dimensional area of the screen in the direction of movement of the screen, and where the ink is passed through the screen only at the line of elemental closest approach and propelled toward said article by the electrostatic field, thereby causing printing to occur only along the elemental line of closest approach to the screen.

30. An apparatus for electrostatically printing articles which have a central axis and an annular surface of revolution about said axis; said apparatus comprising base means, support means operatively mounted on said base means for supporting said article and being rotatable about an axis, a screen having a substantially flat printing surface mounted in relation to said article and being shiftable in a plane, means for creating an electrostatic field between said screen and said article, said support means having its axis of rotation established so that a line of contact exists between the flat printing surface of said screen and the annular surface of said article, means for rotating said article about its axis of rotation so that the surface to receive the ink tangentially approaches, forms an elemental line of instantaneous tangential contact and tangentially departs from the screen, means for shifting said screen in timed relation to the rotation of said article and in a tangential plane which passes through the elemental line of instantaneous contact and maintains contact with the article thereat, a shield stationarily mounted on said base means and having a narrow slit forming a printing gap interposed between said screen and article, said slit being positioned at the elemental line of contact and being sufficiently wide to permit passage of ink along the line of contact and sufficiently small to prevent overspray of ink and uneven ink deposition, and means operatively associated with said screen for feeding a selected quantity of electroscopic ink to said screen in a substantially thin flat line only along the line of instantaneous contact where relative movement exists between the surface of the screen and the thin flat line, said thin flat line being substantially equal to the dimension of the screen which is transverse to the direction of movement of said screen and occupying a small dimensional area of the screen in the direction of movement of the screen, and where the ink is passed through the screen only at the line of tangential contact and propelled toward said article by the electrostatic field, thereby causing printing to occur only along the elemental line of instantaneous tangential contact.

31. An apparatus for electrostatically printing articles which have a central axis and an annular surface of revolution about said axis; said apparatus comprising base means, support means operatively mounted on said base means for supporting said article and being rotatable about an axis, a curvilinear screen mounted in relation to said article and being shiftable through an arc about an axis, said screen having a surface which is curvilinear about said last-named axis, means for creating an electrostatic field between said screen and said article, said support means having its axis of rotation established so that a line of closest approach to said screen is parallel to the curvilinear surface of said screen, means for rotating said article about its axis of rotation so that the surface to receive the ink tangentially approaches, forms an instantaneous elemental line of closest approach and tangentially departs from the screen, means for arcuately shifting said screen about its axis of arcuate shiftable movement in timed relation to the rotation of said article so that the curvilinear surface of the screen passes through the elemental line of closest approach, a shield stationarily mounted on said base means and having a narrow slit forming a printing gap interposed between said screen and article, said slit being positioned at the elemental line of contact and being sufficiently wide to permit passage of ink along the line of contact and sufficiently small to prevent overspray of ink and uneven ink deposition, and means operatively associated with said screen for feeding a selected quantity of electroscopic ink to said screen in a substantially thin flat line only along the elemental line of closest approach, where relative movement exists between the surface of the screen and the thin flat line, said thin flat line being substantially equal to the dimension of the screen which is transverse to the direction of movement of said screen and occupying a small dimensional area of the screen in the direction of movement of the screen, and where the ink is passed through the screen only at the line of elemental closest approach and propelled toward said article by the electrostatic field, thereby causing printing to occur only along the elemental line of closest approach to the screen.

32. An apparatus for electrostatically printing on articles which have a central axis and an annular surface of revolution about said axis; said apparatus comprising base means, support means operatively mounted on said base means for supporting said article and being rotatable about an axis, a screen having an annular surface of revolution mounted in relation to said article and being rotatable about an axis, the axis of rotation of said screen being coincident with the central axis of the surface of revolution of said screen, means for creating an electrostatic field between said screen and said article, said support means having its axis of rotation established so that a line of contact exists between the annular surface of said screen and the annular surface of said article, means for rotating said article about its axis of rotation so that the surface to receive the ink tangentially approaches, forms an elemental line of instantaneous tangential contact and tangentially departs from the screen, means for rotating said screen about its axis of rotation in timed relation to the rotation of said article so that the annular surface of the screen passes through the elemental line of contact and maintains instantaneous contact with the article thereat, a shield stationarily mounted on said base means and having a narrow slit forming a printing gap interposed between said screen and article, said slit being positioned at the elemental line of contact and being sufficiently wide to permit passage of ink along the line of contact and sufficiently small to prevent overspray of ink and uneven ink deposition, and means operatively associated with said screen for feeding a selected quantity of electroscopic ink to said screen in a substantially thin flat line only along the line of instantaneous contact where relative movement exists between the surface of the screen and the thin flat line, said thin flat line being substantially equal to the dimension of the screen which is transverse to the direction of movement of said screen and occupying a small dimensional area of the screen in the direction of movement of the screen, and where the ink is passed through the screen only at the line of tangential contact and propelled toward said article by the electrostatic field, thereby causing printing to occur only along the elemental line of instantaneous tangential contact.

33. An apparatus for electrostatically printing an article having a central axis and a hyperbolic surface of revolution, said apparatus comprising means for supporting said article and for rotating said article about its central axis, a curvilinear screen mounted in relation to said article and being shiftable through an arc about an axis with respect to said article, said screen also having an arcuate surface which matches the hyperbolic surface of revolution of said article, means for creating an electrostatic field between said screen and said article, means for feeding a selected quantity of electroscopic ink to said screen where the ink is passed through the open portions of the screen and propelled toward said article by the electrostatic field, means for shifting said screen in timed relation to the rotation of the article so the screen tangentially approaches and departs from the article thereby forming an elemental line of closest approach, means for positioning the article so that all points of the article at the elemental line of closest approach are equidistant from all opposed points of the screen at the elemental line of closest approach, the axis of revolution of said screen being substantially parallel in at least one plane to the line of closest approach, and means for rotating said article so that the surface to receive the ink tangentially approaches and departs from the screen, thereby causing printing to occur along the elemental line of closest approach to the screen.

34. An apparatus for electrostatically printing articles which have a central axis and an annular surface of revolution which is hyperbolic about said axis; said apparatus comprising support means for supporting said article and being rotatable about an axis, a screen having an arcuate surface which matches the hyperbolic surface of revolution of said article, means for creating an electrostatic field between said screen and said article, means for positioning the article so that all points of the article at the elemental line of closest approach are equidistant from all opposed points of the screen at the elemental line of closest approach, means for rotating said article about its axis of rotation so that the surface to receive the ink tangentially approaches, forms an instantaneous elemental line of closest approach and tangentially departs from the screen, means for shifting said screen in a tangential plane which passes through the elemental line of closest approach and in timed relation to the rotation of said article, and means operatively associated with said screen for feeding a selected quantity of electroscopic ink to said screen in a substantially thin flat line only along the elemental line of closest approach, where relative movement exists between the surface of the screen and the thin flat line, said thin flat line being substantially equal to the dimension of the screen which is transverse to the direction of movement of said screen and occupying a small dimensional area of the screen in the direction of movement of the screen, and where the ink is passed through the screen only at the line of elemental closest approach and propelled toward said article by the electrostatic field, thereby causing printing to occur only along the elemental line of closest approach to the screen.

35. An apparatus for electrostatically printing an article having a central axis and a hyperbolic surface of revolution, said apparatus comprising means for supporting said article and for rotating said article about its central axis, a screen mounted in relation to said article and being shiftable with respect thereto, said screen having an arcuate surface which matches the hyperbolic surface of revolution of said article, means for creating an electrostatic field between said screen and said article, means for feeding a selected quantity of electroscopic ink to said screen where the ink is passed through the open portions of the screen and propelled toward said article by the electrostatic field, means for shifting said screen in timed relation to the rotation of the article so the screen tangentially approaches, instantaneously contacts and departs from the article thereby forming an elemental line of contact, means for positioning the article so that all points of the article at the elemental line of contact are in direct contact with all opposed points of the screen at the elemental line of contact, and means for rotating said article so that the surface to receive the ink tangentially approaches, instantaneously contacts and departs from the screen, thereby causing printing to occur along the elemental line of contact between the article and the screen.

36. An apparatus for electrostatically printing articles which have a central axis and an annular surface of revolution which is hyperbolic about said axis; said apparatus comprising support means for supporting said article and being rotatable about an axis, a screen having an arcuate surface which matches the hyperbolic surface of revolution of said article, means for creating an electrostatic field between said screen and said article, means for positioning the article so that all points of the article at the elemental line of closest approach are equidistant from all opposed points of the screen at the elemental line of closest approach, means for rotating said article about its axis of rotation so that the surface to receive the ink tangentially approaches, forms an elemental line of instantaneous tangential contact and tangentially departs from the screen, means for shifting said screen in timed relation to the rotation of said article and in a tangential plane which passes through the elemental line of instantaneous contact and maintains contact with the article thereat, and means operatively associated with said screen for feeding a selected quantity of electroscopic ink to said screen in a substantially thin flat line only along the line of instantaneous contact where relative movement exists between the surface of the screen and the thin flat line, said thin flat line being substantially equal to the dimension of the screen which is transverse to the direction of movement of said screen and occupying a small dimensional area of the screen in the direction of movement of the screen, and where the ink is passed through the screen only at the line of tangential contact and propelled toward said article by the electrostatic field, thereby causing printing to occur only along the elemental line of instantaneous tangential contact.

* * * * *